(12) United States Patent
Bogrett

(10) Patent No.: US 7,131,624 B2
(45) Date of Patent: Nov. 7, 2006

(54) LANDSCAPE EDGING FORM ASSEMBLY AND METHOD

(76) Inventor: Blake B. Bogrett, 5461 S. Vivian St., Littleton, CO (US) 80127

( * ) Notice: Subject to any disclaimer, the term of this patent is extended or adjusted under 35 U.S.C. 154(b) by 0 days.

(21) Appl. No.: 10/929,262

(22) Filed: Aug. 30, 2004

(65) Prior Publication Data

US 2006/0043256 A1  Mar. 2, 2006

(51) Int. Cl.
   *E04G 9/08* (2006.01)
(52) U.S. Cl. .................. 249/4; 249/6; 249/8; 249/213; 249/216
(58) Field of Classification Search ............... 249/5, 249/6, 9, 213
   See application file for complete search history.

(56) References Cited

U.S. PATENT DOCUMENTS

| | | | | |
|---|---|---|---|---|
| 457,886 A * | 8/1891 | Landis | ............ | 404/7 |
| 965,979 A * | 8/1910 | Young | ............ | 249/2 |
| 1,202,269 A * | 10/1916 | Cramer | ............ | 249/8 |
| 1,255,611 A * | 2/1918 | Innes | ............ | 404/89 |
| 1,257,945 A * | 2/1918 | Lee | ............ | 238/175 |
| 1,601,347 A * | 9/1926 | Church | ............ | 249/8 |
| 1,664,169 A * | 3/1928 | Harrold | ............ | 249/9 |
| 1,770,518 A * | 7/1930 | Harrold | ............ | 249/5 |
| 1,939,007 A * | 12/1933 | Heltzel | ............ | 264/31 |
| 2,298,837 A | 10/1942 | Oswald | | |
| 2,626,444 A * | 1/1953 | Wolf et al. | ............ | 249/8 |
| 2,663,925 A * | 12/1953 | Yates | ............ | 249/6 |
| 3,148,444 A * | 9/1964 | Stark | ............ | 29/455.1 |
| 3,166,871 A | 1/1965 | Simison | | |
| 3,385,552 A * | 5/1968 | Von Drasek et al. | ............ | 249/4 |
| 3,753,545 A * | 8/1973 | Stegmeier | ............ | 249/219.1 |
| 3,778,019 A * | 12/1973 | Stegmeier | ............ | 249/189 |
| 3,985,329 A * | 10/1976 | Liedgens | ............ | 249/40 |
| 4,185,805 A * | 1/1980 | Ewing | ............ | 249/210 |
| 4,222,197 A | 9/1980 | Johnson | | |
| 4,326,735 A * | 4/1982 | Hunder et al. | ............ | 285/15 |
| 4,340,200 A * | 7/1982 | Stegmeier | ............ | 249/3 |
| 4,494,725 A | 1/1985 | Sims | | |
| 4,579,312 A * | 4/1986 | White | ............ | 249/6 |
| 4,601,140 A | 7/1986 | Russo | | |
| 4,619,433 A * | 10/1986 | Maier | ............ | 249/18 |
| 4,635,895 A | 1/1987 | Johnson, Jr. et al. | | |
| 4,679,763 A * | 7/1987 | Brotherton | ............ | 29/446 |
| 4,712,764 A * | 12/1987 | White | ............ | 249/6 |
| 4,750,703 A * | 6/1988 | Gentilcore et al. | ............ | 249/6 |
| 4,776,555 A * | 10/1988 | Maynard | ............ | 249/6 |
| 4,824,068 A * | 4/1989 | Ferland | ............ | 249/2 |
| 4,836,487 A | 6/1989 | Ringler | | |
| 4,915,345 A * | 4/1990 | Lehmann | ............ | 249/18 |
| 4,934,093 A | 6/1990 | Yanna | | |

(Continued)

*Primary Examiner*—Patricia L. Engle
*Assistant Examiner*—Gay Ann Spahn
(74) *Attorney, Agent, or Firm*—John D. Lister

(57) ABSTRACT

A landscape edging form assembly for forming a concrete edging in place, includes first and second sidewalls and a series of flexible connectors extending between and interconnecting the sidewalls. The flexible connectors are spaced apart from each other in the direction of the length of the landscape edging form and enable the landscape edging form to be extended from a non-erected width where the flexible connectors are in a slack condition to an erected width where the flexible connectors are in a taut condition. Preferably, the sidewalls and the interconnecting flexible connectors of the landscape edging form assembly are a prefabricated component of the assembly. Another form assembly includes bendable sidewalls, spacers, and positioning brackets and is used to form a sinuous concrete landscape edging in place.

16 Claims, 6 Drawing Sheets

U.S. PATENT DOCUMENTS

| | | | |
|---|---|---|---|
| D323,604 S | 2/1992 | Deschryver | |
| 5,125,617 A * | 6/1992 | Miller | 249/18 |
| 5,154,837 A * | 10/1992 | Jones | 249/2 |
| 5,156,753 A * | 10/1992 | Speidel | 249/5 |
| 5,230,187 A | 7/1993 | Reimann | |
| 5,323,578 A * | 6/1994 | Chagnon et al. | 52/426 |
| 5,492,303 A * | 2/1996 | Jaruzel | 249/4 |
| 5,857,300 A * | 1/1999 | Gates | 52/426 |
| 5,863,453 A * | 1/1999 | Hardin | 249/196 |
| 6,021,994 A * | 2/2000 | Shartzer, Jr. | 249/6 |
| 6,526,713 B1 * | 3/2003 | Moore, Jr. | 52/309.11 |
| 6,530,552 B1 * | 3/2003 | Bergaretxe | 249/4 |
| 6,629,681 B1 * | 10/2003 | Miller et al. | 249/3 |
| 6,698,710 B1 * | 3/2004 | VanderWerf | 249/216 |
| 6,705,582 B1 * | 3/2004 | Osborn | 249/6 |
| 6,817,590 B1 * | 11/2004 | Gargiulo | 249/205 |
| 6,874,288 B1 * | 4/2005 | Washa et al. | 52/371 |
| 2002/0061342 A1 * | 5/2002 | Jensen | 425/234 |
| 2004/0226259 A1 | 11/2004 | Barnet et al. | 52/783.1 |
| 2005/0087670 A1 * | 4/2005 | Kushlan | 249/5 |

\* cited by examiner

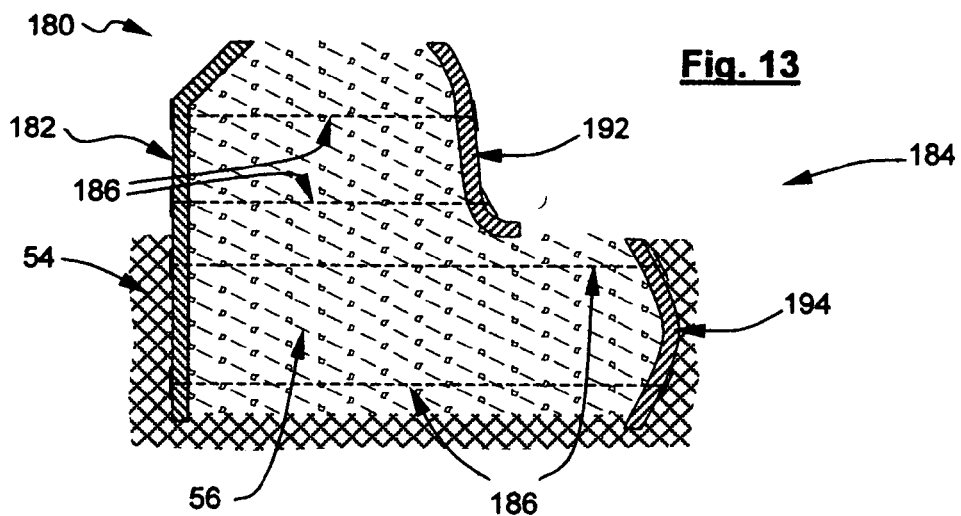
Fig. 13
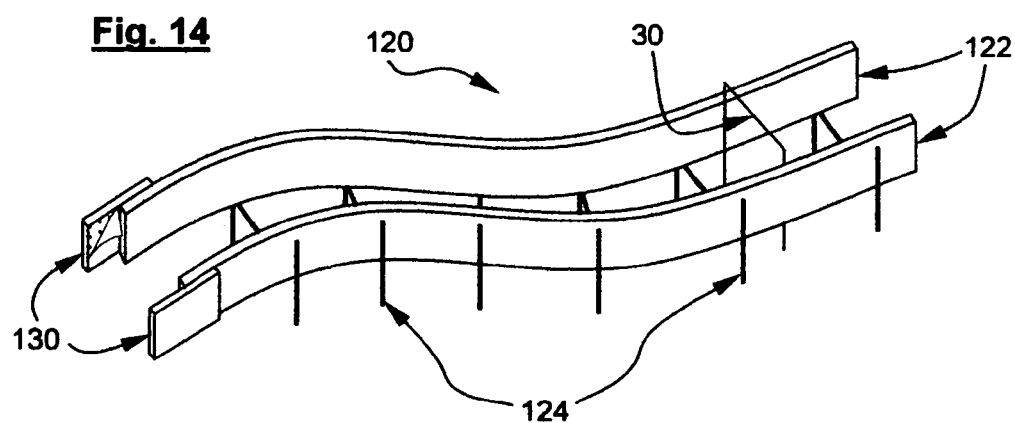
Fig. 14
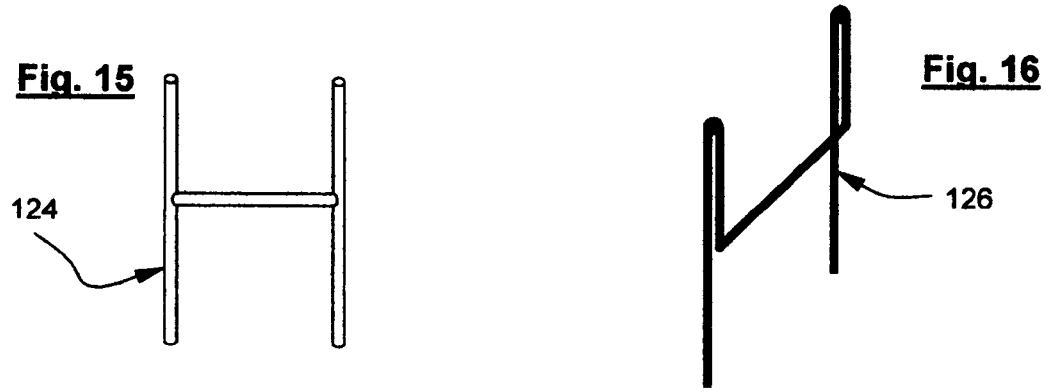
Fig. 15
Fig. 16
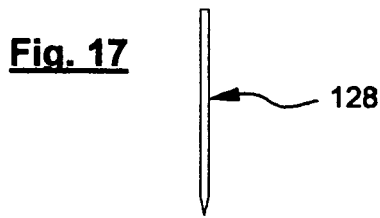
Fig. 17

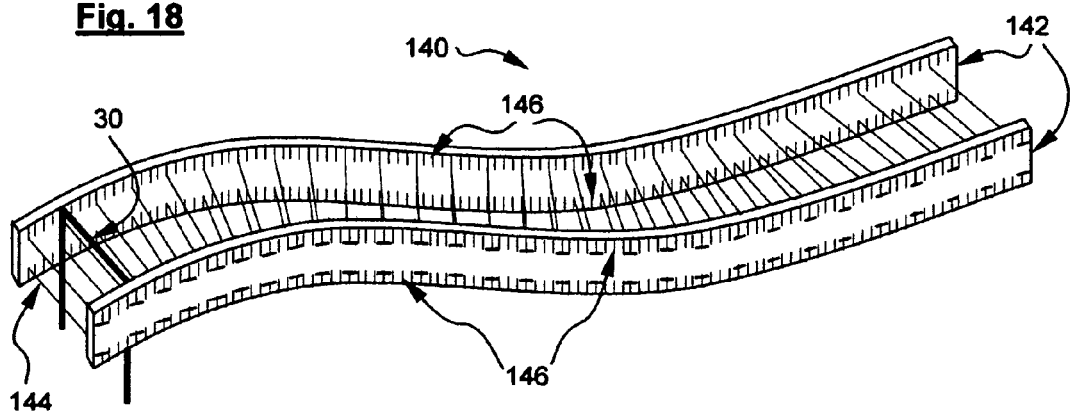
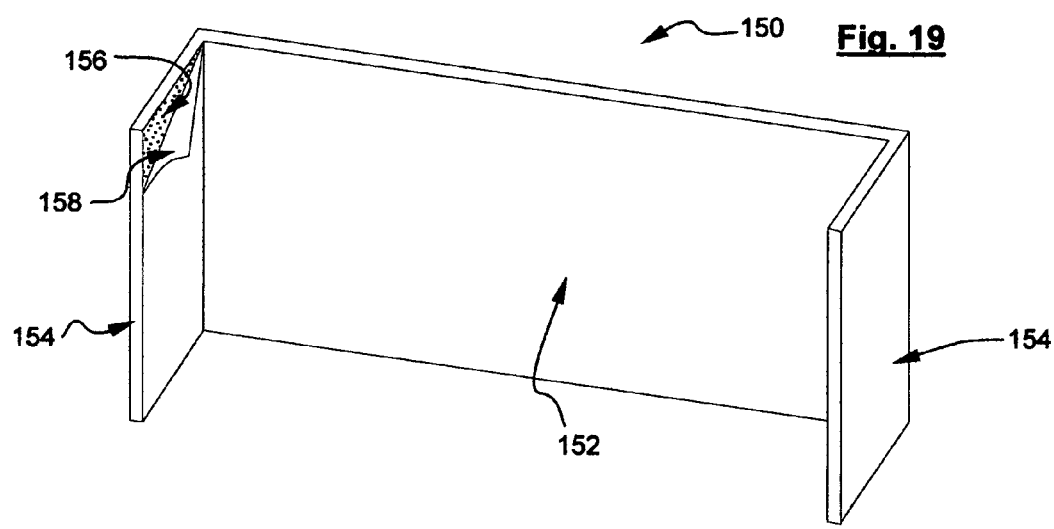
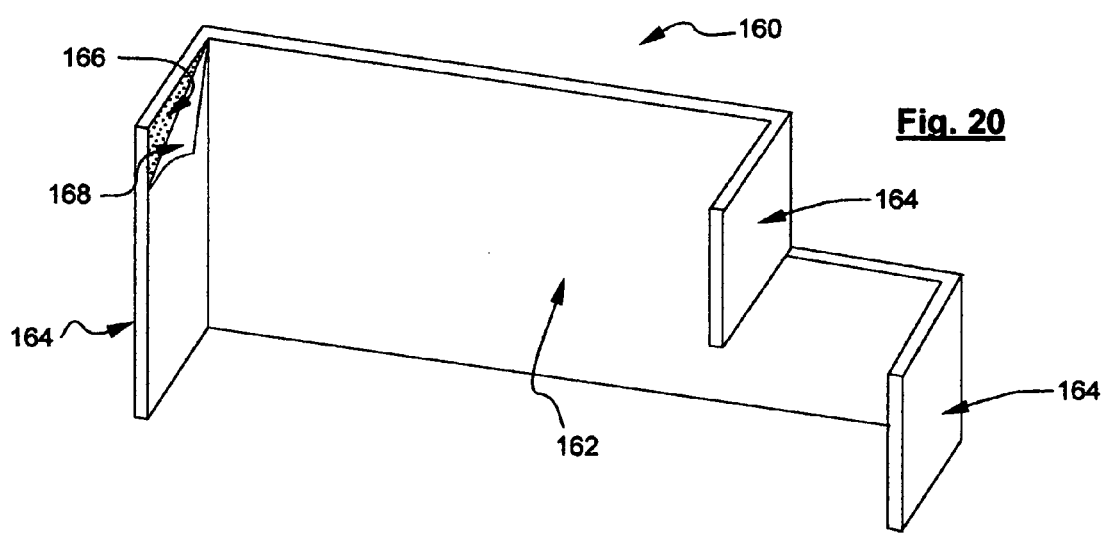

LANDSCAPE EDGING FORM ASSEMBLY AND METHOD

BACKGROUND OF THE INVENTION

The subject invention relates to concrete landscape edging and in particular to an easy to use, inexpensive, landscape edging form assembly and method of utilizing the landscape edging form assembly to construct concrete landscape edging in place. While the landscape edging form assembly of the subject invention is particularly well suited for use in making concrete landscape edging such as but not limited to concrete edging bordering a garden or lawn, surrounding a tree, plants, or shrubbery, or adjacent a walkway, a driveway, it should be understood that the landscape edging form assembly of the subject invention may also be used to make other concrete edgings associated with landscaping such as but not limited to the edging for a patio or deck, the edging surrounding a swimming pool deck, sandbox or play area, retaining walls, and other applications where an elongated concrete structure having a transverse cross section up to about two feet wide is desired. As used herein, the term "landscape edging form assembly" includes an edging form assembly used for any of the applications set forth in this paragraph.

The landscape edging form assembly of the subject invention can be made of inexpensive disposable or reusable materials and can be erected into straight, angled, curved, sinuous, circular, and oval configurations at the job site. Preferably, the components of the landscape edging form assembly of the subject invention can be easily packaged in a very flat and compact configuration for storage, shipment, and handling and can be quickly and easily unpacked and erected at the job site. While the easy to use and inexpensive landscape edging form assembly and method of the subject invention are particularly well suited for use by the home handy-man, small size contractors, and other entities typically operating on a limited budget and/or with unskilled labor, large contractors can also benefit from the use of the landscape edging form assembly and method of the subject invention.

Concrete landscape edging is desirable because it is durable, can come in different colors, and gives a more substantial break between different landscaping materials than other commonly used landscape edging such as plain or corrugated steel edging strips, plain or corrugated plastic edging strips, composite edging strips, pre-cast concrete blocks, and most wood edging strips. Concrete landscape edging is typically 3" to 6" wide, 3" to 6" high, and typically has a transverse cross-sectional shape that is rectangular or "L" shaped.

There are currently three general ways to form concrete landscape edging in place: 1) build concrete forms using existing building materials such as 2×4 and 2×6 dimensional lumber; 2) use a concrete edging extrusion machine such as that produced by Tygar Inc. of Canton, Ga. to extrude continuous concrete edging; and 3) assemble reusable forming systems, typically made out of steel and typically used on large commercial jobs. While a concrete edging extrusion machine can be used to form a continuous concrete edging, with the expense, expertise, and labor required in connection with the use of a concrete edging extrusion machine, such a machine is not a practical option for a home handy-man, a small contractor, or even a large contractor when the edging job to be performed is a relatively small job, such as the concrete landscape edging requirements for a home owner. Reusable forming systems, such as those made of steel and commonly used for large commercial applications, are also too expensive and cumbersome to transport, handle, and set up for a home handy-man, a small contractor or even a large contractor when the edging job to be performed is a relatively small job, such as the concrete landscape edging requirements for a home owner.

Of the three general ways to form concrete landscape edging in place listed above, the building of landscape edging forms from existing materials appears to be the best option in the prior art for small jobs. However, there are several problems inherent in the building of landscape edging forms from existing building materials for the in place formation of concrete landscape edging. To fabricate a landscape edging form from existing building materials, basic building materials, such as 2×4's or 2×6's, at least equal to two times the length of the landscape edging form must be purchased and assembled. For example, more than 20 feet of forming material would be required (10 feet for each side plus short sections for the ends) to fabricate an edging form designed to make a concrete landscape edging that is 10 feet in length. In addition to the expense, dimensional lumber is relatively bulky, heavy, and increasingly not very straight. The fabrication of landscape edging forms from dimensional lumber normally requires the measuring and marking of the dimensional lumber so that the dimensional lumber can be cut to the required lengths; the cutting of the dimensional lumber to the measured lengths with an electric saw or other tool, and the use of numerous fasteners to assemble the edging form offside or onsite. Where an edging form or series of edging forms are fabricated offsite, the edging form(s) need to be transported to the job site and then, maneuvered around and located at the job site prior to introducing concrete into the form(s).

Fabricating landscape edging form(s) from existing building materials also requires ensuring that the pieces of dimensional lumber comprising the two sidewalls of the landscape edging form(s) extend parallel with respect to each other. This is typically done by placing wooden or metal stakes in the ground on the outside of the landscape edging form(s) to hold the dimensional lumber sidewalls of the form(s) in place. These stakes are typically heavy, bulky, and expensive and can be easily misaligned so that the dimensional lumber sidewalls of the form(s) are not parallel with respect to each other. In addition, it is very common for the sidewalls in this type of landscape edging form to shift prior to or during the introduction and working of the concrete within the form so that a finished concrete landscape edging made with the form is not uniform in width. This shifting of the form sidewalls can be caused by not using enough stakes to secure the form; by soft or rocky ground that either allows the stakes to shift or prevents the stakes from being driven an adequate distance into the ground to prevent subsequent movement of the sidewalls especially when the concrete is introduced into the form; etc.

Building landscape edging forms for concrete landscape edging from existing building materials also introduces additional fabrication steps that should be followed when constructing such landscape edging forms. After the landscape edging forms are built and prior to introducing the concrete into the forms, these wooden forms should be treated with a release agent to ensure that the forms can be easily separated from the concrete landscape edging once the concrete has set and the formation of the landscape edging is complete. The release agent may be an oil-based product and, like many of the other fabrication steps required in the construction of these wooden edging forms, the application of the release agent to the wooden forms by hand brushing or spraying is labor intensive and time consuming. In addition, the application of the release agent to the wooden forms at the job site typically results in some ground contamination. After these wooden forms are built and treated with a release agent, concrete is poured or shoveled into the forms. Then, a short, straight, rigid object (typically a short section of dimensional lumber) is used to level off the wet concrete to a level substantially even with the top of the form sidewalls. Where the top portions of the stakes used to position the form sidewalls are higher than the forms, the stakes get in the way of leveling off the wet concrete with the dimensional lumber.

In addition to the time, work, expense, and expertise required to fabricate landscape edging forms from dimensional lumber, the use of such forms often presents disposal problems. After the concrete has set up in the wooden forms to fabricate the concrete landscape edging, the wooden forms are normally removed from the edging. However, the dimensional lumber of these wooden forms is typically covered with a thin layer of hardened concrete. Disposing of lengths of dimensional lumber covered with concrete and a release agent can be expensive and/or labor intensive. Many residential trash collectors will not take building products and recyclers typically require all dried concrete be removed from lumber prior to recycling the lumber into mulch. Another drawback to using dimensional lumber for the fabrication of landscape edging forms is that dimensional lumber landscape edging forms are best suited for the creation of straight sections of concrete landscape edging. For many applications where a circular or smooth curved section of concrete landscape edging is desired, it is not practical for a home-handyman or small contractor (due to a lack of skill and/or time) to construct a landscape edging form from dimensional lumber that can be used to make such a circular or smooth curved section of concrete landscape edging.

In addition to the systems discussed above for forming concrete landscape edging in place, U.S. Pat. No. 4,222,197 to Johnson discloses a system for forming concrete garden curbing in place. The Johnson patent discloses a concrete receiving form B made of cardboard, paper mache, peat moss or the like. The form B has a generally V-shaped transverse cross section, is formed by folding a blank A, and utilizes rigid clips C to keep the sidewalls of the form B in a fixed transverse relationship. The form B cannot be flexed or bent into a curved configuration and thus, can only be used to make straight-line forms. For a curved configuration, the Johnson patent discloses the use of forms that are molded or extruded from a suitable material such as plastic.

In addition to forming concrete landscape edging in place, landscape edging can be assembled onsite from preformed members. U.S. Pat. No. 4,601,140 to Russo; U.S. Pat. No. 4,934,093 to Yanna; and Des. 323,604 to Deschryver disclose landscape edging systems that utilize preformed landscape edging members to assemble landscape edging onsite. Another system for forming landscape edging utilizes reusable plastic molds that form two concrete "bricks" at a time. Once the concrete has set up in the mold to form the two "bricks", the mold is removed and used to form another two "bricks".

U.S. Pat. No. 4,340,200 to Stegmeier; U.S. Pat. No. 4,824,068 to Ferland; and U.S. Pat. No. 5,156,753 to Speidel are exemplary of landscape edging form systems that utilize wooden, steel, or plastic form boards that can be flexed or are bendable to assume other than a straight configuration. U.S. Pat. No. 2,298,837 to Oswald; U.S. Pat. No. 4,494,725 to Sims; U.S. Pat. No. 4,635,895 to Johnson, Jr. et al; U.S. Pat. No. 4,836,487 to Ringler; and U.S. Pat. No. 5,230,187 to Reimann are exemplary of landscape edging form board holders that can be used with dimensional lumber in the fabrication of forms for concrete edging.

SUMMARY OF THE INVENTION

The in place landscape edging formation system and method of the subject invention for making concrete landscape edging provide an easy to use, inexpensive system and method for making concrete landscape edging. The landscape edging form assemblies of the subject invention are inexpensive; can be made of disposable or reusable materials; can be easily and quickly erected and laid down in straight, angled, curved, sinuous, circular, or oval configurations at the job site by either unskilled or skilled labor; and preferably, are prefabricated.

A first landscape edging form assembly of the subject invention includes two sidewalls that are rigid, flexible, or bendable and made of an inexpensive material, e.g. a corrugated board such as but not limited to faced corrugated paperboard. Preferably, the sidewalls of this landscape edging form assembly are interconnected by a series of flexible connectors (e.g. flexible connectors such as strands, wires, straps, strings, cords or twines that are made from organic or inorganic fibers or filaments). When the first landscape edging form assembly of the subject invention is used in the method of the subject invention to form concrete landscape edging or a section of concrete landscape edging that is of a substantially constant width throughout its length, the flexible connectors of the form assembly are equal or substantially equal to each other in length and locate the sidewalls of the form assembly a selected distance apart when the form assembly is erected at the job site with the sidewalls of the form assembly extending parallel or substantially parallel with respect to each other along the length of the form assembly.

A second landscape edging form assembly of the subject invention includes two sidewalls that are rigid, flexible, or bendable and made of an inexpensive material, e.g. corrugated board such as but not limited to a corrugated paperboard. One of the sidewalls of this landscape edging form assembly has an upper section and a lower section. The lower section of this sidewall is spaced laterally outward from the upper section along the length of this second form assembly. Preferably, the sidewalls of this landscape edging form assembly are interconnected by a series of flexible connectors (e.g. flexible connectors such as strands, wires, straps, strings, cords or twines that are made from organic or inorganic fibers or filaments). As with the first landscape edging form assembly of the subject invention, the lengths of the flexible connectors of this second form assembly are selected relative to each to locate the sidewalls of the form assembly a selected distance apart along the length of the form assembly. With this structure, when the form assembly is erected at the job site, the sidewalls of the form assembly are located to provide the landscape edging form assembly and the concrete landscape edging formed with the form assembly with the desired width and contours along its length. The stepped concrete landscape edging made with this second form not only is aesthetically pleasing, but also permits the wheels of a lawnmower to run along the concrete landscape edging to easily cut the grass right up to the edging.

The flexible connectors interconnecting the sidewalls of the first two embodiments of the landscape edging form assembly of the invention are inexpensive. In addition, the use of the flexible connectors in these embodiments of the landscape edging form assembly of the subject invention enables the landscape edging form assembly of the subject invention to be prefabricated; easily packaged in a collapsed and compact configuration for storage, shipment, and handling; and quickly and easily unpackaged and erected at the job site. Typically, the landscape edging form assemblies of the subject invention utilize spacers that enable the form assemblies to be accurately and quickly set up with the sidewalls of the form assemblies held in place at the selected spacing(s). In some embodiments of the invention, the spacers also form control joints at spaced apart locations along the length of concrete landscape edgings formed with the form assemblies. The spacers can be made of various materials, e.g. polymeric sheet materials, foamed polymeric based sheet materials, metal, wood, corrugated board, etc. and can be disposable or reusable.

For certain applications, especially where a sinuous landscape edging is desired, rigid or semi-rigid spacers and positioning brackets or rigid or semi-rigid spacer/positioning brackets may be used to locate the sidewalls of the landscape edging form assemblies of the subject invention relative to each other.

The interior surfaces of the sidewalls of the forms of the subject invention can be treated with a release agent, can be embossed or debossed to create an aesthetic design, effect, or pattern in the concrete, and/or can have a colorant that transfers to the concrete. In addition, the upper edges of the sidewalls, especially when the sidewalls are made of corrugated paperboard, can be sealed to prevent moisture from entering the walls through their upper edges when the forms are filled with concrete. One embodiment of the landscape edging form of the subject invention includes the ability to adjust the flexible connectors relative to the sidewalls of the form at the job site to shape the form into various selected curvatures. In another embodiment of the invention, the landscape edging form of the subject invention is prefabricated with the flexible connectors connecting the sidewalls of the form locating the sidewalls with a preselected round, oval, or sinuous curvature.

As used herein, the term "Portland cement" refers to a powder of alumina, silica, lime, iron oxide and magnesium oxide used as an ingredient of concrete. As used herein the term "concrete" means a building material made by mixing a cementing material (e.g. portland cement) and a mineral aggregate (as sand and gravel) with sufficient water to cause the cement to set and bind the entire mass or a building material (mortar) made by mixing a cementing material (e.g. portland cement) and a mineral aggregate (as sand) with sufficient water to cause the cement to set and bind the entire mass.

While the edging form assembly of the subject invention is particularly well suited for making concrete landscape edging, it is contemplated that the edging form assembly of the subject invention may also be used to form other concrete structures of various shapes and sizes where the concrete structures are formed in place.

BRIEF DESCRIPTION OF THE DRAWINGS

FIG. 13 is a transverse cross section through a landscape edging form assembly of the subject invention that is similar to the landscape edging form assembly of FIG. 9 and filled with concrete. However, unlike the sidewalls of the landscape edging form assembly of FIG. 9, the sidewalls of the landscape edging form assembly of FIG. 13 have contours that are other than straight.

FIG. 14 is a schematic perspective view of a landscape edging form assembly of the subject invention wherein the sidewalls of the form assembly are located relative to each other and held in place by spacers and positioning brackets.

FIG. 15 is a schematic view, on a larger scale than FIG. 14, of a positioning bracket used in the landscape edging form assembly of FIG. 14.

FIG. 16 is a schematic perspective view, on a larger scale than FIG. 14, of another type of positioning bracket that may be used with the landscape edging form assembly of FIG. 14.

FIG. 17 is a schematic view, on a larger scale than FIG. 14, of a retaining peg that may be used with the positioning bracket in the landscape edging form assembly of FIG. 14 to hold the sidewalls in place prior to the introduction of concrete into the form.

FIG. 18 is a schematic perspective view of a landscape edging form assembly of the subject invention wherein the flexible connector strands can be secured to the sidewalls of the landscape edging form assembly to impart a sinuous configuration to the form assembly.

FIG. 19 is a perspective schematic view of an end cap, on a larger scale than the scales of FIGS. 1, 5, 6, 7, 14 and 18, that can be used with any the landscape edging form assemblies of these Figures to close an otherwise open end of the landscape edging form assembly.

FIG. 20 is a perspective schematic view of an end cap, on a larger scale than the scales of FIGS. 9 and 11, that can be used with any the landscape edging form assemblies of these Figures to close an otherwise open end of the landscape edging form assembly.

DESCRIPTION OF THE PREFERRED EMBODIMENTS

Figure 1:
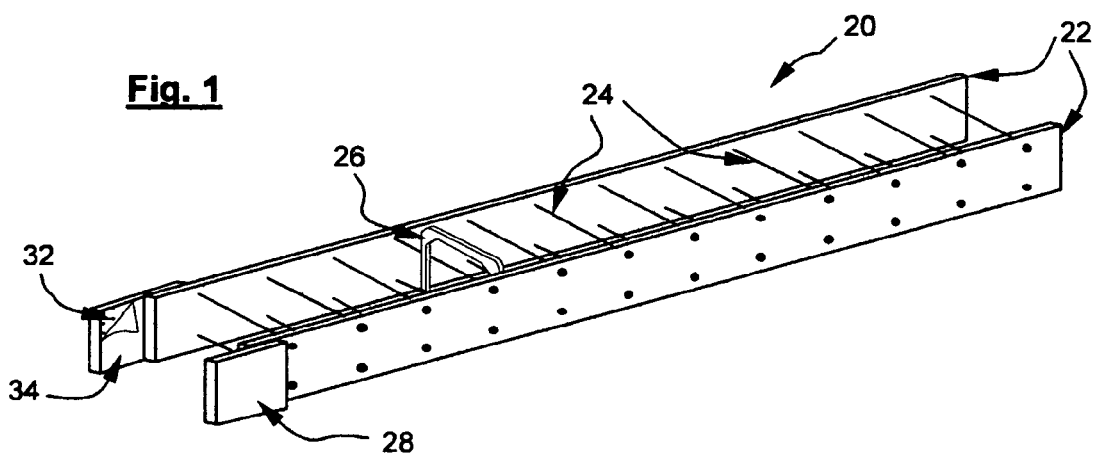
FIG. 1 is a schematic perspective view of a landscape edging form assembly of the subject invention that is typically used to form a straight section of a concrete landscape edging.

FIG. 1 is a schematic perspective view showing a landscape edging form assembly 20 of the subject invention that is designed to form straight lengths of concrete landscape edging in place. The landscape edging form assembly as shown in FIG. 1 is erected and includes first and second sidewalls 22, flexible connector strands 24, one or more spacers 26, and joining extensions 28 for joining the landscape edging form assembly 20 with an adjacent landscape edging form assembly in the fabrication of a landscape edging form made up of a plurality of the landscape edging form assemblies 20. While the landscape edging form assembly 20 is typically about 2 to about 8 inches wide, by about 3 to about 8 inches high, by about 4 to about 10 feet in length, the width, height, and length of the landscape edging form assembly 20 can be selected to best fulfill the requirements of a particular application.

Figure 4:
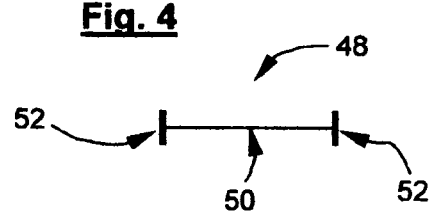
FIG. 4 is a schematic view, on a larger scale than FIG. 1, of an alternate type of flexible connector strand than that of FIG. 1 that may be used with all of the landscape edging form assemblies of the subject invention except the landscape edging form assembly of FIG. 13, which does not utilize connector strands.

The first and second sidewalls 22 of the landscape edging form assembly 20 may be made of various rigid, bendable or flexible sheet materials, such as but not limited to, a faced or unfaced corrugated paperboard, linerboard, polymer-based sheet materials, faced or unfaced corrugated board made of polymer-based materials, faced or unfaced polymer-based foams, various sheet metals including corrugated sheet metal and galvanized sheet metal, or a composite of two or more such materials. The sidewalls 22 will be discussed in greater detail later in the specification. While the sidewalls 22 are shown interconnected by flexible connector strands 24 other flexible connectors, such as but not limited to strings, wires, straps, cords, threads, twines that are made of organic and/or inorganic filaments or fibers, may be used to interconnect the sidewalls 22. The flexible connectors will be discussed in greater detail later in the specification. The flexible connector strands 24 each extend between and connect the sidewalls 22 of the landscape edging form assembly 20 to each other at a selected distance or spacing when the flexible connector strands 24 are taut and the landscape edging form assembly 20 is erected. As shown in FIG. 1, the opposite ends of the flexible connector strands 24 each extend through the sidewalls 22 and are anchored to the sidewalls at the outside surfaces of the sidewalls, e.g. by an adhesive such as but not limited to a hot melt adhesive. However, as an alternative, rather than being anchored to the outside surfaces of the sidewalls 22, the flexible connector strands 24 can be anchored to the inside surfaces of the sidewalls. In addition, the flexible connector strands can be secured to the sidewalls by flexible connectors such as but not limited to the flexible T-end connector strands of FIG. 4 wherein the strands pass through and are slidably retained in the sidewalls of the form assembly, but become anchored to the sidewalls when the flexible connector strands are taut (e.g. when the flexible T-end connector strand of FIG. 4 is taut, the T-ends of the flexible connector strand are pulled tightly against the outside surfaces of the sidewalls to anchor the sidewalls at a fixed maximum spacing from each other.

Since the flexible connector strands 24 set the spacing between the sidewalls 22 when the landscape edging form assembly 20 is erected and concrete is introduced into the form assembly, where the landscape edging form assembly 20 is to be used to form concrete landscape edging that is uniform in width along its length, such as the form assembly 20 of FIG. 1, the lengths of the flexible connector strands 24, between the inner surfaces of the sidewalls 22, should all be substantially the same or preferably, the same. The locations where the flexible connector strands 24 are anchored to the sidewalls 22, including, the spacing or spacings between the individual flexible connector strands 24, should be set to assure that the flexible connector strands 24 in combination with the sidewalls 22 can withstand the outward pressure to be exerted on the sidewalls 22 of the landscape edging form assembly 20 by concrete introduced into the form assembly without having the ends of the flexible connector strands separate from the sidewalls or the sidewalls bow outwardly. In addition, the flexible connector strands 24 should be able to withstand the tension exerted on the flexible connector strands when concrete is introduced into the landscape edging form assembly 20 with substantially no and preferably no elongation of the flexible connector strands 24. In use, the sidewalls 22 of the landscape edging form assembly 20 should remain flat and straight as shown in FIG. 1.

In FIG. 1 the flexible connector strands 24 are anchored to the sidewalls 22 in a pattern wherein the flexible connector strands 24 are located in upper and lower spaced apart rows. The rows are spaced downward from and upward from the upper and lower longitudinally extending edges of the sidewalls 22 and the flexible connector strands of the rows are vertically aligned. While this arrangement of the flexible connector strands 24 functions very well, the flexible connector strands 24 can be anchored to the sidewalls 22 in other patterns or arrangements provided the flexible connector strands in combination with the sidewalls 22 provide the landscape edging form assembly 20 with the desired configuration when the landscape edging form assembly 20 is erected and filled with concrete.

The unique combination of the flexible connector strands 24 and sidewalls 22 in the landscape edging form assembly 20 enables the landscape edging form assembly of FIG. 1 to be collapsed into a non-erected width wherein the flexible connector strands 24 are slack or limp and one of the sidewalls overlays and rests upon the other sidewall. In this non-erected compact state, a plurality of the landscape edging form assemblies 20 can be packaged, stored, shipped, and handled prior to the erection and use of the landscape edging form assemblies.

Figure 2:
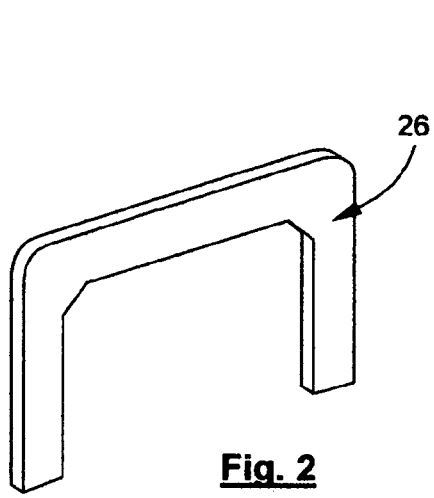
FIG. 2 is a schematic perspective view, on a larger scale than FIG. 1, of the spacer and control joint forming member shown in use with the landscape edging form assembly of FIG. 1. The spacer and control joint forming member of FIG. 2 may also be used with other landscape edging form assemblies of the subject invention.
Figure 3:
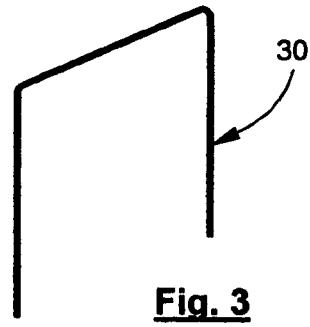
FIG. 3 is a schematic perspective view, on a larger scale than FIG. 1, of an alternate spacer that may be used with the landscape edging form assemblies of FIGS. 1 and other landscape edging form assemblies of the subject invention.

The spacer 26 used in the landscape edging form assembly 20 of FIG. 1, and shown on a larger scale in FIG. 2, is dimensioned to maintain the sidewalls 22 of the landscape edging form assembly 20 the designed distance apart and the flexible connector strands 24 taut when the spacer 26 is inserted into an erected landscape edging form assembly. The spacer 26 has a generally inverted U-shaped configuration with the outer and inner edges of the upper bridge portion and depending arm portions of the spacer 26 spaced from each other so that the spacer 26 forms control joints in the concrete landscape edging made with the form assembly to accommodate the expansion and contraction of the edging. The thickness of the spacer 26 and the spacing between the inner and outer edges of the spacer 26 are selected to from a groove in a finished concrete landscape edging made with the form assembly 20 that has the width and depth needed to provide an effective control joint. The spacer is typically between about ⅛ and about ½ inches thick and the spacing between the inner and outer edges of the spacer is typically between about ¼ and about ¼ inches. The spacer 26 may be made of faced or unfaced corrugated paperboard, paperboard, polymeric sheet materials, faced or unfaced corrugated board made from polymeric based materials, faced or unfaced polymeric based foams, various sheet metals including corrugated sheet metal and galvanized sheet metal, or composites of two or more such materials, which will be discussed in greater detail later in the specification. Once a concrete edging has been formed with a landscape edging form assembly using the spacer 26, the spacer 26 may be removed from the concrete edging or left in place.

Where there is no need for control joints, a spacer such as but not limited to the spacer 30 of FIG. 3 may be used to maintain the sidewalls 22 at their desired spacing prior to filling the landscape edging form assembly 20 with concrete. The spacer 30 is an inverted U-shaped metal or plastic rod and can be removed from the landscape edging form assembly 20 after the landscape edging form assembly is filled with concrete to a level that maintains the sidewalls 22 of the form assembly the designed distance apart.

The joining extensions 28 of the landscape edging form assembly 20 include two extension tabs that preferably extend from the sidewalls 22 at one end of the landscape edging form assembly 20 in planes parallel to or substantially parallel to the planes of the sidewalls 22. Preferably, the joining extensions 28 are each made of faced corrugated paperboard, are each equal in height to or substantially equal in height to the heights of the sidewalls 22, and are each adhesively mounted on the outer surfaces of the sidewalls 22 so that when the joining extensions are used to join two landscape edging form assemblies, the sidewalls 22 of the two assemblies are aligned in the same or substantially the same planes. Preferably the portions of the joining extensions 28 that extend beyond the sidewalls 22 have pressure sensitive adhesive coatings 32 on their inner surfaces that are overlaid by release liners 34. When the landscape edging form assembly 20 is joined to another landscape edging form assembly, the release liners 34 are removed from the adhesive coatings 32 and the joining extensions 28 are pressed against the outer surfaces of the sidewalls of the other landscape edging form assembly so that adhesive coatings 32 bond the joining extensions 28 to the outer surfaces of these sidewalls and the landscape edging form assemblies together. In addition to joining the landscape edging form assemblies together, the joining extensions reinforce the joint between the landscape edging form assemblies.

Preferably, the sidewalls 22 and the flexible connector strands 24 are preassembled so that these components of the landscape edging form assembly 20 do not have to be assembled at the job site. In addition, for some applications, the joining extensions 28 of landscape edging form assembly 20 are also preassembled with the sidewalls 22 and the flexible connector strands 24 so that these components of the landscape edging form assembly 20 do not have to be assembled at the job site. With this prefabricated construction, once the ground is prepared for the concrete landscape edging, a series of the landscape edging form assemblies 20 can be easily and quickly erected and made ready for the introduction of concrete. The user of the landscape edging form assembly 20 need only: erect the landscape edging form assemblies on the prepared ground where the concrete landscape edging is to be formed; insert the one or more spacers, such as the spacers 26 or 30, to maintain the form assemblies' flexible connector strands 24 taut and the form assemblies' sidewalls 22 at the designed spacing from each other; join the landscape edging form assemblies to each other with the joining extensions 28 of the assemblies to complete the fabrication of the landscape edging form; introduce concrete into the joined form assemblies 20; level the upper surface of the concrete in the form assemblies 20; allow the concrete to set in the form assemblies 20; and remove the form assemblies 20 from the concrete landscape edging thus formed. While not preferred, instead of using spacers, such as the spacers 26 or 30, the user may drive retaining pegs into the ground that extend vertically along and bear against the inner surfaces of the sidewalls 22 to maintain the flexible connector strands 24 taut and the sidewalls 22 of the landscape edging form assemblies at the designed spacing from each other prior to the introduction of concrete into the form assemblies 20. With this procedure, once concrete has been introduced into the landscape edging form assemblies 20, the concrete will maintain the flexible connector strands 24 taut and the sidewalls 22 at the desired spacing. Accordingly, once the concrete is introduced into the form assemblies, the retaining pegs may be removed from within the form assemblies so that the retaining pegs do not become part of or mar the appearance of the finished concrete landscape edging. To facilitate the removal of the retaining pegs, when used, from within the form assemblies 20, preferably, the retaining pegs are sufficiently long that the retaining pegs extend above the upper edges of the sidewalls 22 after the retaining pegs have been driven into the ground. Preferably, the retaining pegs are removed from within the form assemblies 20 prior to leveling the upper surface of the concrete within the form assemblies so that the retaining pegs do not interfere with the leveling operation. The landscape edging form assembly 20 may be disposable or reusable.

While, as discussed above, the landscape edging form assembly 20 may be prefabricated with the joining extensions 28 already secured to the outside surfaces of the sidewalls 22 as shown in FIG. 1, the joining extensions 28 may also be applied to and adhesively bonded or otherwise secured to the sidewalls of two successive landscape edging form assemblies at the job site. With the entire inner surfaces of the joining extensions 28 each having an adhesive coating 32, such as pressure sensitive adhesive coating, overlaid by a release liner 34, the user would merely have to peel off the release liners and apply the joining extensions 28 to the outside surfaces of the sidewalls of the two form assemblies to bridge the joint between and join the sidewalls of the two landscape edging form assemblies. In addition to the joining extensions 28, a tape having a width that preferably is substantially equal to or greater than the height of the sidewalls 22 can be applied and bonded to the inside surfaces of the sidewalls 22 at the job site to bridge the joint between the sidewalls 22 of the two landscape edging form assemblies and form a smoother surface on the concrete landscape edging being formed with the form assemblies. As with the landscape edging form assembly 20, the joining extensions used with the other landscape edging form assemblies of the subject invention may be applied at the job site and tape may be applied to inside surfaces of the sidewalls to bridge the joints at the job site.

Figure 5:
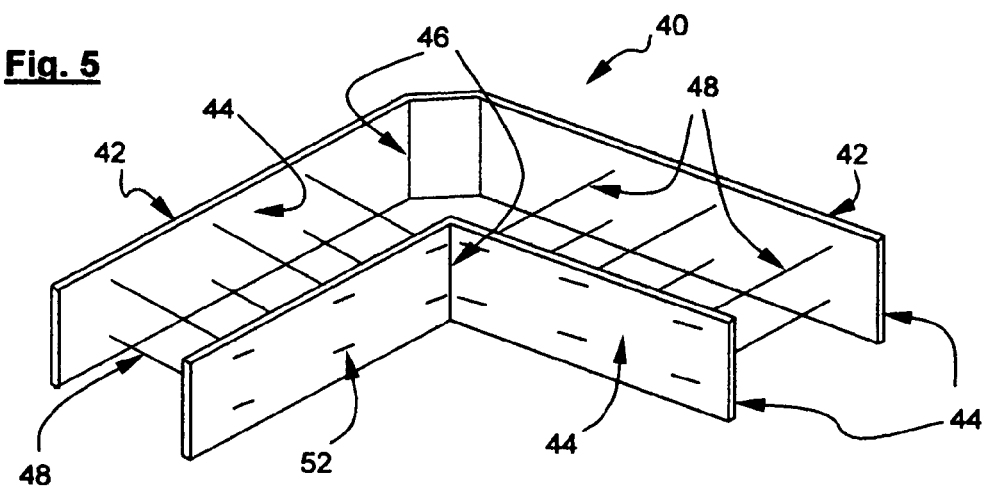
FIG. 5 is a schematic perspective view of an angled landscape edging form assembly of the subject invention that is typically used to form a right angle corner section of a concrete landscape edging. While the landscape edging form assembly shown in FIG. 4 is a right angle landscape edging form assembly, the angle at which the two arms of the assembly meet can be other than 90° e.g. 60°, 45°, 30°, etc.

FIG. 5 is a schematic perspective view showing an erected angled landscape edging form assembly 40 of the subject invention having first and second arms 42 extending at an angle to each other from a common corner joint. While the arms 42 are shown extending at 90° to each other, depending on the application, the arms 42 may also extend at other angles to each other such as but not limited to 60°, 45°, 30°, etc.

The angled landscape edging form assembly 40 has inner and outer sidewalls 44. Preferably, the inner and outer sidewalls 44 of the form assembly are each made out of a single piece of sheet material. The sheet materials forming the inner and outer sidewalls 44 are bent at the corner 46 to form the sidewalls 44 of the first and second arms 42 of the angled landscape edging form assembly 40. As shown, in FIG. 5, the flexible connectors 48 interconnecting the sidewalls 44 of the angled landscape edging form assembly 40 are flexible T-end connector strands such as the flexible T-end connector strand shown in larger scale in FIG. 4. The flexible T-end connector strand 48 is typically made of nylon and includes a single strand 50 with an integral T-shaped head 52 at each end. Just as other flexible connectors, such as the flexible connector strands 24 used with the landscape edging form assembly 20, may be used with the angled landscape edging form assembly 40, the flexible T-end connector strands 48 may be used on the other landscape edging form assemblies of the subject invention.

When making concrete landscape edgings, the angled landscape edging form assembly 40 may be used with other angled landscape edging form assemblies 40 to fabricate, depending on the angle between the arms 42 of the landscape edging form assembly, landscape edging forms having various configurations such as but not limited to square, rectangular, triangular, quintuple, hexagonal, and octagonal configurations. The angled landscape edging form assembly 40 may also be used with the landscape edging form assembly 20 to fabricate landscape edging forms of various sizes and configurations.

Other than being angled rather than straight and shown using the flexible connector strands 48 rather than the flexible connector strands 24 of the form assembly 20, the angled landscape edging form assembly 40 is the same as the landscape edging form assembly 20. The sidewalls 44 may be made of the same sheet materials as the sidewalls 22, the flexible connector strands 48 function in the same manner as the flexible connector strands 24 and cooperate with the sidewalls 44 in the same manner as the flexible connector strands 24 cooperate with the sidewalls 22. The spacers 26 and 30 may be used with the angled landscape edging form assembly 40 in the same way the spacers 26 and 30 are used with the landscape edging form assembly 20, and although not shown in FIG. 5, joining extensions may be used on the angled landscape edging form assembly 40 in the same manner the joining extensions 28 are used on the landscape edging form assembly 20.

In a manner similar to the landscape edging form assembly 20, the flexible connector strands 48 enable the angled landscape edging form assembly 40 to be collapsed into a non-erected width wherein the flexible connector strands 48 are slack or limp and one of the sidewalls overlays and rests or substantially rests upon the other sidewall. In this non-erected compact state, a plurality of the landscape edging form assemblies 40 can be packaged, stored, shipped, and handled prior to the erection and use of the angled landscape edging form assemblies. Preferably, the sidewalls 44, the flexible connector strands 48, and, for some applications, the joining extensions 28 of landscape edging form assembly 40 are preassembled so that these components of the landscape edging form assembly 40 do not have to be assembled at the job site. With this prefabricated construction, once the ground is prepared for the concrete landscape edging, a series of the landscape edging form assemblies 40 can be easily and quickly erected and made ready for the introduction of concrete.

Figure 6:
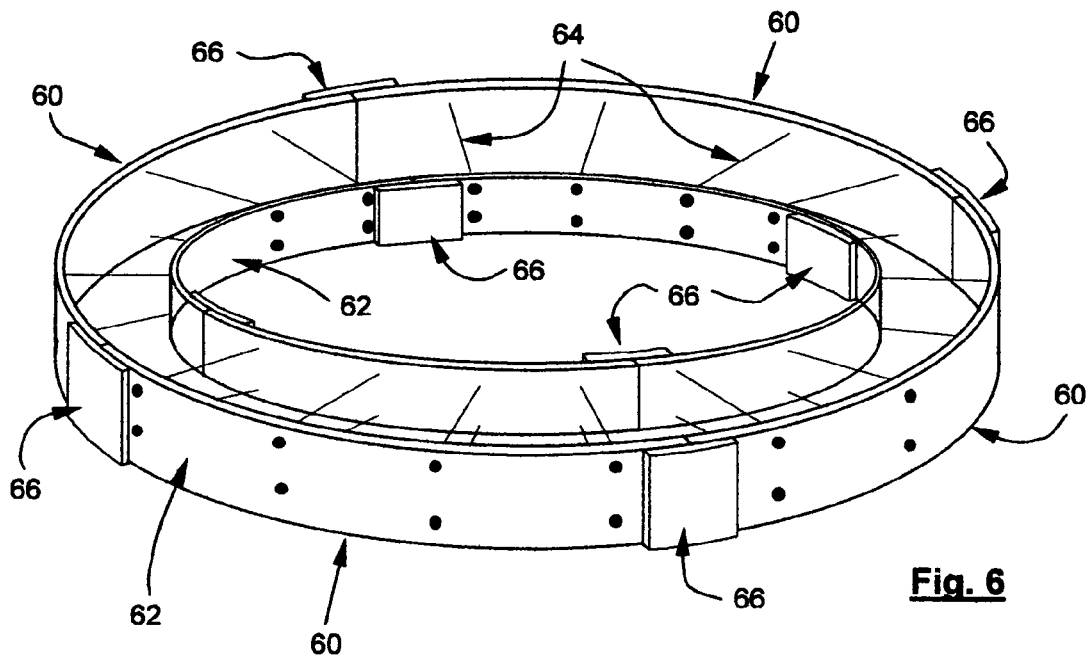
FIG. 6 is a schematic perspective view of four landscape edging form assemblies of the subject invention that are assembled into a circular landscape edging form.

FIG. 6 is a schematic perspective view of a circular landscape edging form made up of four curved landscape edging form assemblies 60 of the subject invention. Each of the curved landscape edging form assemblies 60 has inner and outer sidewalls 62 with the inner sidewall being shorter in length than the outer sidewall. Preferably, the inner and outer sidewalls 62 of each form assembly 60 are made out of a single piece of sheet material that is flexible or at least bendable and flexible connectors, such as the flexible connector strands 64, interconnect the inner and outer sidewalls 62 of each form assembly.

Figure 7:
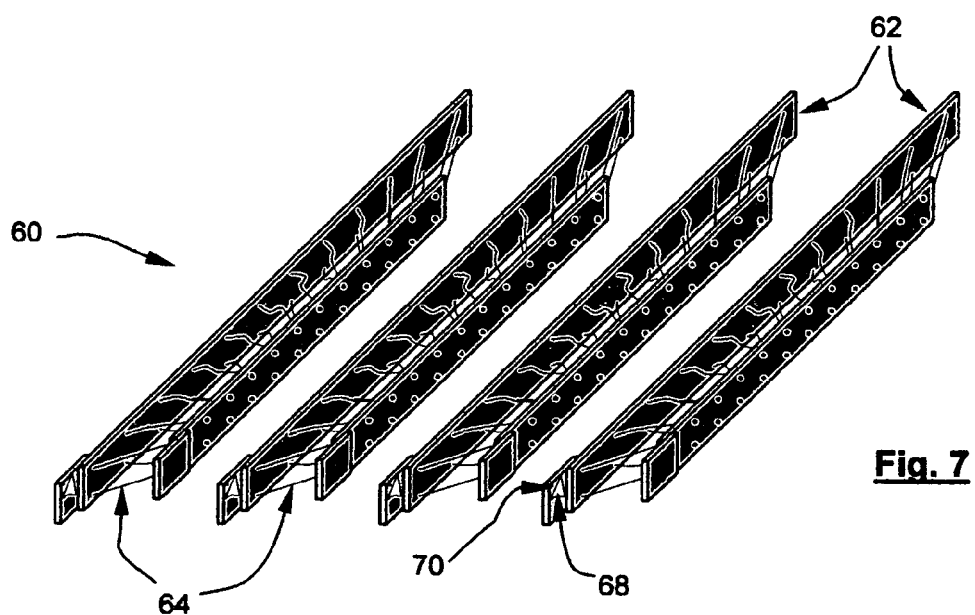
FIG. 7 is a schematic perspective view of the four landscape edging form assemblies of the circular landscape edging form of FIG. 6 in a partially erected state and prior to their assembly into the form of FIG. 6.

As shown in FIG. 7, when the curved landscape edging form assemblies 60 are in their non-erected or partially collapsed state with the flexible connector strands 64 slack or limp, the sidewalls 62 of the form assemblies 60 are straight or substantially straight. While the sidewalls of the curved landscape edging form assemblies 60 are not shown overlaying and resting on each other, the form assemblies 60 can be collapsed until the sidewalls 62 of each form assembly 60 are overlaying and resting on each other. As with the landscape edging form assemblies 20 and 40, in this non-erected compact state, a plurality of the curved landscape edging form assemblies 60 can be packaged, stored, shipped, and handled prior to the erection and use of the curved landscape edging form assemblies.

When the curved landscape edging assemblies 60 are erected, as shown in FIG. 6, the flexible connector strands 64 cooperate with the bendable sidewalls 62 of the curved landscape edging form assemblies 60 to shape the curved landscape edging form assemblies into curved configurations. When making concrete landscape edgings, the curved landscape edging form assembly 60 may have an arcuate configuration when erected and may be used with other like curved landscape edging form assemblies 60 to fabricate a circular landscape edging form as shown in FIG. 6. The landscape edging form assemblies 60 can be made in various sizes and with various curvatures so that, when the form assemblies 60 are used with other like form assemblies, landscape edging forms of various sizes and configurations can be fabricated from the form assemblies 60. For example, the flexible connector strands 64 can be affixed to the sidewalls 62 and cooperate with the sidewalls 62 of the landscape edging form assemblies 60 to configure the curved landscape edging form assemblies to fabricate, when erected and used with other like form assemblies, circular landscape edging forms of different selected diameters. The flexible connector strands 64 can also be sized and affixed to the sidewalls 62 of the form assemblies 60 to cooperate with the sidewalls 62 of the landscape edging form assemblies 60 to configure the landscape edging form assemblies 60, when erected, to have oval or other curved configurations of various dimensions. The curved landscape edging form assemblies 60 may also be used with the landscape edging form assemblies 20 to fabricate landscape edging forms of various sizes and configurations.

Other than being curved rather than straight, requiring the use of bendable sidewalls 62, and affixing the flexible connector strands 64 to the sidewalls 62 to cause the sidewalls to bend when the curved landscape edging assembly 60 is erected, the curved landscape edging form assembly 60 is the same as the landscape edging form assembly 20. As long as the sheet materials are bendable, the sidewalls 62 may be made of the same sheet materials as the sidewalls 22. Other than causing the curved landscape edging form assembly 60 to assume a curved configuration when the curved landscape edging form is erected, the flexible connector strands 64 function in the same manner as the flexible connector strands 24 and cooperate with the sidewalls 44 in the same manner as the flexible connector strands 24 cooperate with the sidewalls 22 to set the sidewalls at the correct spacing and in the desired configuration. While not shown, the spacers 26 and 30 may be used with the curved landscape edging form assembly 60 in the same way the spacers 26 and 30 are used with the landscape edging form assembly 20. The joining extensions 66 with their release liner 68 covered pressure sensitive adhesive coatings 70 are used on the curved landscape edging form assembly 60 in the same manner the joining extensions 28 are used on the landscape edging form assembly 20.

Preferably, the sidewalls 62, flexible connector strands 64, and joining extensions 66 of landscape edging form assembly 60 are preassembled so that these components of the landscape edging form assembly 60 do not have to be assembled at the job site. With this prefabricated construction, once the ground is prepared for the concrete landscape edging, a series of the landscape edging form assemblies 60 can be easily and quickly erected and made ready for the introduction of concrete.

Figure 8:
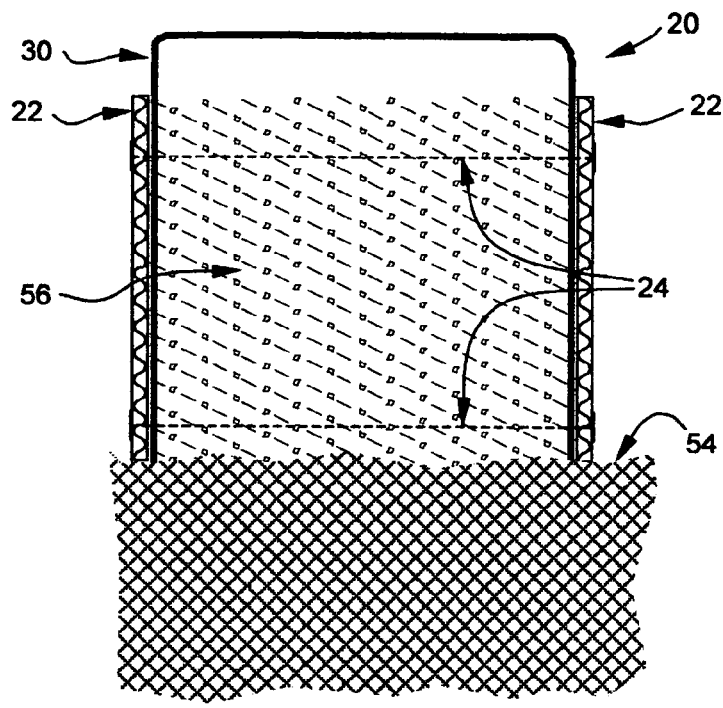
FIG. 8 is a transverse cross section through the landscape edging form assembly of FIG. 1 showing the landscape edging form assembly erected.

FIG. 8 is a schematic transverse cross section through the landscape edging form assembly 20 of FIG. 1. The form assembly 20 is erected, located on the ground 54, and filled with concrete 56. The flexible connector strands 24, shown in phantom line, connect the sidewalls 22. The flexible connector strands 22 are taut and a spacer 30 that is partially driven into the ground extends between the inner surfaces of the sidewalls. While the landscape edging form assembly 20 is shown resting on the surface of the ground 54 so that the concrete landscape edging formed with the form assembly 20 is located completely above ground level, the ground 54 may be prepared so that the landscape edging form assembly 20 is partially below ground level and the concrete landscape edging formed with the form assembly 20 is only partially above ground level or totally below ground level so that the top surface of the concrete landscape edging formed is with the form assembly 20 ground level or somewhat below ground level. In addition, while FIG. 8 is a schematic transverse cross section through the landscape edging form assembly 20, FIG. 8 is also representative the structure of the angled landscape form assembly 40 and the curved landscape form assembly 60 when these form assemblies are erected and in use.

Figure 9:
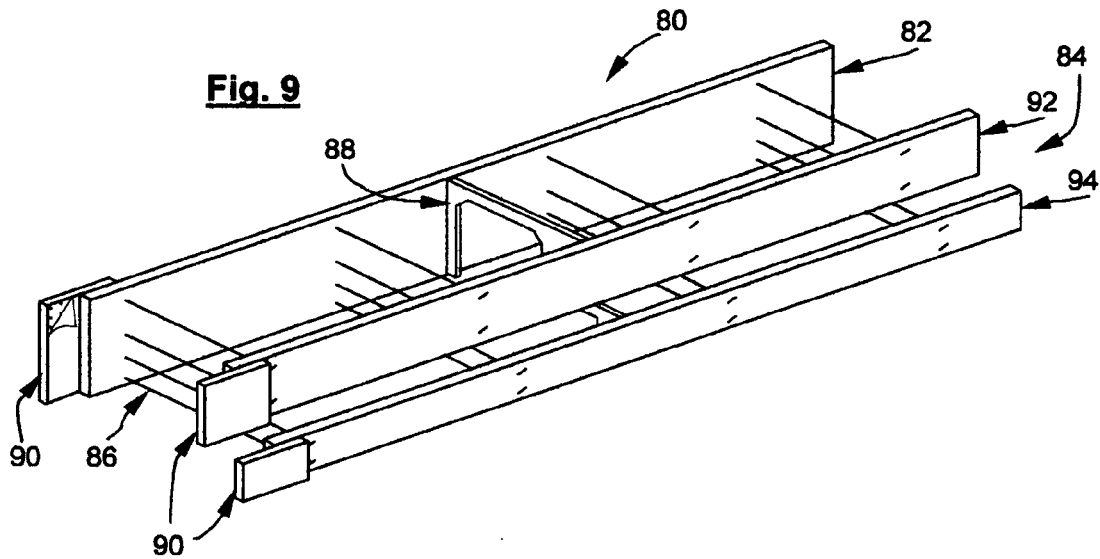
FIG. 9 is a schematic perspective view of a landscape edging form assembly of the subject invention that is designed to form a concrete landscape edging with a generally L-shaped transverse cross section.

FIG. 9 is a schematic perspective view showing a landscape edging form assembly 80 of the subject invention that is designed to form, in place, straight lengths of concrete landscape edging having a generally L-shaped transverse cross section. The landscape edging form assembly 80 as shown in FIG. 9 is erected and includes first and second sidewalls 82 and 84, flexible connector strands 86, one or more spacers 88, and joining extensions 90 for joining the landscape edging form assembly 80 with an adjacent landscape edging form assembly in the fabrication of a landscape edging form made up of a plurality of the landscape edging form assemblies 80. The second sidewall 84 of the form assembly includes an upper section 92 and a lower section 94. The lower section 94 of the second sidewall 84 is spaced farther away from the first sidewall 82 than the upper section 92 of the second sidewall 84 and the top longitudinally extending edge of the lower section 94 and the bottom longitudinally extending edge 92 of the second sidewall are located in the same or substantially the same horizontal plane so that the form assembly 80 has a generally L-shaped cross section with an upper portion and a base portion beneath the upper portion that extends laterally out from one side of the upper portion. The upper portion of the landscape edging form assembly 80 is typically about 3 to about 6 inches wide, by about 3 to about 6 inches in height and the base portion of the landscape edging form assembly is typically about 5 to about 9 inches wide by about 2 to about 4 inches in height. The landscape edging form assembly 80 is typically about 4 to about 10 feet in length. While the above dimensions are typical dimensions for the landscape edging form assembly 80, the width, height, and length of the landscape edging form assembly 80 can be selected to best fulfill the requirements of a particular application.

The first and second sidewalls 82 and 84 of the landscape edging form assembly 80 may be made of various rigid or flexible sheet materials, such as but not limited to, a faced or unfaced corrugated paperboard, linerboard, polymer-based sheet materials, faced or unfaced corrugated board made of polymer-based materials, faced or unfaced polymer-based foams, various sheet metals including corrugated sheet metal and galvanized sheet metal, or a composite of two or more such materials. The sidewalls 82 and 84 will be discussed in greater detail later in the specification. While the sidewalls 82 and 84 are shown interconnected by flexible connector strands 86, other flexible connectors, such as but not limited to flexible connectors made of wires, straps, cords, threads, or twine of organic and/or inorganic filaments or fibers, may also be used to interconnect the sidewalls. The flexible connectors will be discussed in greater detail later in the specification. The flexible connector strands 86 each extend between and connect the sidewalls 82 and 84 of the landscape edging form assembly 80 to each other at a selected distance or spacing when the flexible connector strands 86 are taut and the landscape edging form assembly 80 is erected. The flexible connector strands 86 connecting the upper portion of the sidewall 82 to the upper section 92 of the sidewall 84 are shorter in length than the flexible connector strands 86 connecting the lower portion of the sidewall 82 to the lower section 94 of the sidewall 84 so that when the landscape edging form assembly 80 is erected the upper section 92 of the sidewall 84 is closer to the sidewall 82 than the lower section 94 of the sidewall 84. As shown in FIG. 9, the opposite ends of the flexible connector strands 86 each extend through the sidewalls 82 and 84 and are anchored to the sidewalls at the outside surfaces of the sidewalls by the T-ends of the flexible connector strands.

Since the flexible connector strands 86 set the spacing between the sidewalls 82 and 84 when the landscape edging form assembly 80 is erected and concrete is introduced into the form assembly, where the landscape edging form assembly 80 is to be used to form concrete landscape edging that is uniform in width along its length, such as the form assembly 80 of FIG. 9, the lengths of the flexible connector strands 86 between the inner surface of the sidewall 82 and the inner surface of upper wall section 92 of sidewall 84 should all be substantially the same or preferably, the same and the lengths of the flexible connector strands 86 between the inner surface of the sidewall 82 and the inner surface of lower wall section 94 of sidewall 84 should all be substantially the same or preferably, the same. The locations where the flexible connector strands 86 are anchored to the sidewalls 82 and 84, including, the spacing or spacings between the individual flexible connector strands 86, should be set to assure that the flexible connector strands 86 in combination with the sidewalls 82 and 84 can withstand the outward pressure to be exerted on the sidewalls of the landscape edging form assembly 80 by concrete introduced into the form assembly without having the ends of the flexible connector strands separate from the sidewalls or the sidewalls bow outwardly. In addition, the flexible connector strands 86 should be able to withstand the tension exerted on the flexible connector strands when concrete is introduced into the landscape edging form assembly 80 with substantially no and preferably no elongation of the flexible connector strands 86. In use, the sidewalls 82 and 84 of the landscape edging form assembly 80 should remain flat and straight as shown in FIG. 9.

In FIG. 9 the flexible connector strands 86 are anchored to the sidewalls 82 and 84 in a pattern wherein the flexible connector stands 86 are located in upper and lower sets of spaced apart rows. The rows are spaced downward from and upward from the upper and lower longitudinally extending edges of the sidewall 82 and the sections 92 and 94 of the sidewall 84 and the flexible connector strands of the rows are vertically aligned. While this arrangement of the flexible connector strands 86 functions very well, the flexible connector strands 86 can be anchored to the sidewalls 82 and 84 in other patterns or arrangements provided the flexible connector strands in combination with the sidewalls 82 and 84 provide the landscape edging form assembly 80 with the desired configuration when the landscape edging form assembly 80 is erected and filled with concrete.

The unique combination of the flexible connector strands 86 and sidewalls 82 and 84 in the landscape edging form assembly 80 enables the landscape edging form assembly of FIG. 9 to be collapsed into a non-erected width wherein the flexible connector strands 86 are slack or limp and one of the sidewalls overlays and rests upon the other sidewall. In this non-erected compact state, a plurality of the landscape edging form assemblies 80 can be packaged, stored, shipped, and handled prior to the erection and use of the landscape edging form assemblies.

Figure 10:
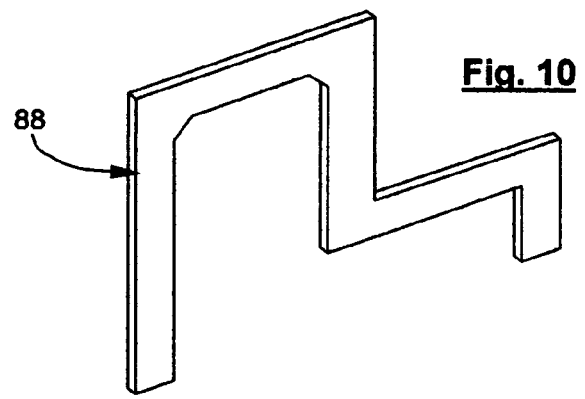
FIG. 10 is a schematic perspective view, on a larger scale than FIG. 9, of a spacer and control joint forming member of the landscape edging form assembly of FIG. 9.

The spacer 88 used in the landscape edging form assembly 80 of FIG. 9, and shown on a larger scale in FIG. 10, is dimensioned to maintain the sidewalls 82 and 84 of the landscape edging form assembly 80 the designed distance apart and the flexible connector strands 86 taut when the spacer 88 is inserted into an erected landscape edging form assembly. The spacer 88 has a stepped generally L-shaped configuration with the outer and inner edges of the bridge portion and depending arm portions of the spacer 88 spaced from each other so that the spacer 88 forms control joints in the concrete landscape edging made with the form assembly to accommodate the expansion and contraction of the edging. The thickness of the spacer 88 and the spacing between the inner and outer edges of the spacer 88 are selected to form a groove in a finished concrete landscape edging made with the form assembly 80 that has the width and depth needed to provide an effective control joint. The spacer 88 is typically between about ⅛ and about ½ inches thick and the spacing between the inner and outer edges of the spacer is typically between about ¼ and about 1¼ inches. The spacer 88 may be made of faced or unfaced corrugated paperboard, paperboard, polymer-based sheet materials, faced or unfaced corrugated board made of polymer-based sheet materials, faced or unfaced polymer-based foams, various sheet metals including corrugated sheet metal and galvanized sheet metal, or composites of two or more such materials. The spacer 88 will be discussed in greater detail later in the specification. Where there is no need for control joints, a spacer having the same general configuration as the spacer 88, but made from a metal or plastic rod may be used to maintain the sidewalls 82 and 84 at their desired spacing and the upper and lower sections 92 and 94 of the sidewall 84 properly located prior to filling the landscape edging form assembly 20 with concrete. After the landscape edging form assembly 80 is filled with concrete to a level that maintains the sidewalls 82 and 84 of the form assembly the designed distance apart with the sections of the sidewall 84 properly located, this type of spacer may be removed.

The joining extensions 90 of the landscape edging form assembly 80 include one extension tab that extends from sidewall 82 and two extension tabs that extend from the upper and lower sections of sidewalls 84. Preferably, the extensions 90 are located at one end of the landscape edging form assembly 80 in planes parallel to or substantially parallel to the planes of the sidewalls 82 and 84. Preferably, the joining extensions 90 are each made of faced corrugated paperboard, are each equal in height to or substantially equal in height to the height of the sidewall 82 and sections 92 and 94 of the sidewall 84, and are each adhesively mounted on the outer surfaces of the sidewalls 82 and 84 so that when the joining extensions are used to join two landscape edging form assemblies, the sidewalls 82 and 84 of the two assemblies are aligned in the same or substantially the same planes. Preferably the portions of the joining extensions 90 that extend beyond the sidewalls 82 and 84 have pressure sensitive adhesive coatings on their inner surfaces that are overlaid by release liners. When the landscape edging form assembly 80 is joined to another landscape edging form assembly, the release liners are removed from the adhesive coatings and the joining extensions 90 are pressed against the outer surfaces of the sidewalls of the other landscape edging form assembly so that adhesive coatings bond the joining extensions 90 to the outer surfaces of these sidewalls and the landscape edging form assemblies together. In addition to joining the landscape edging form assemblies together, the joining extensions reinforce the joint between the landscape edging form assemblies.

Preferably, the sidewalls 82 and 84 and the flexible connector strands 86 are preassembled so that these components of the landscape edging form assembly 80 do not have to be assembled at the job site. In addition, for some applications, the joining extensions 90 of landscape edging form assembly 80 are preassembled so that these components of the landscape edging form assembly 80 do not have to be assembled at the job site. With this prefabricated construction, once the ground is prepared for the concrete landscape edging, a series of the landscape edging form assemblies 80 can be easily and quickly erected and made ready for the introduction of concrete. The user of the landscape edging form assembly 80 need only: erect the landscape edging form assemblies on the prepared ground where the concrete landscape edging is to be formed; insert the one or more spacers, such as the spacers 88, to maintain the form assemblies' connector strands 86 taut and the form assemblies' sidewalls 82 and 84 at the designed spacing from each other and the sections of the sidewall 84 properly located; join the landscape edging form assemblies to each other with the joining extensions 90 of the assemblies to complete the fabrication of the landscape edging form; introduce concrete into the joined form assemblies 80; level the upper surface of the concrete in the form assemblies 80;

allow the concrete to set in the form assemblies 80; and remove the form assemblies 80 from the concrete landscape edging thus formed.

While, as discussed above, the landscape edging form assembly 80 may be prefabricated with the joining extensions 90 already secured to the outside surfaces of the sidewalls 82 and 84 as shown in FIG. 9, the joining extensions 90 may also be applied to and adhesively bonded or otherwise secured to the sidewalls of two successive landscape edging form assemblies at the job site. With the entire inner surfaces of the release extensions 90 each having an adhesive coating, such as pressure sensitive adhesive coating, overlaid by a release liner, the user would merely have to peel off the release liners and apply the joining extensions 90 to the outside surfaces of the sidewalls of the two form assemblies to bridge the joint between and join the sidewalls of the two landscape edging form assemblies. In addition to the joining extensions 90, a tape having a width that preferably is substantially equal to or greater than the height of the sidewalls 82 and 84 can be applied and bonded to the inside surfaces of the sidewalls 82 and 84 at the job site to bridge the joint between the sidewalls 82 and 84 of the two landscape edging form assemblies and form a smoother surface on the concrete landscape edging being formed with the form assemblies. As with the landscape edging form assembly 80, the joining extensions used with the other generally L-shaped landscape edging form assemblies of the subject invention may be applied at the job site and tape may be applied to inside surfaces of the sidewalls to bridge the joints at the job site.

Figure 11:
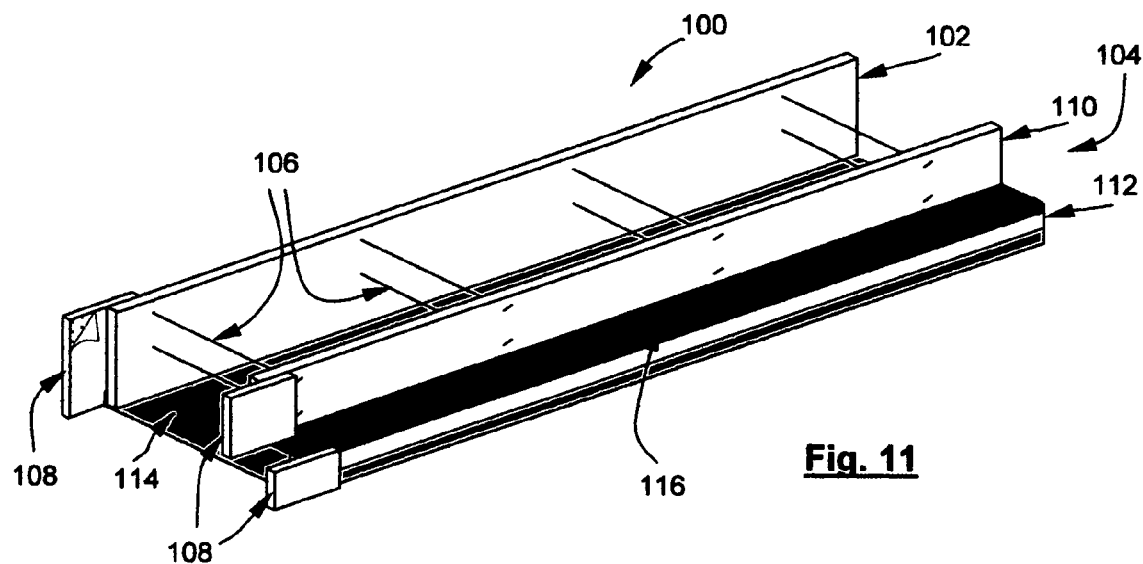
FIG. 11 is a schematic perspective view of a landscape edging form assembly of the subject invention that is similar to the landscape edging form assembly of FIG. 9 and designed to form a concrete landscape edging with a generally L-shaped transverse cross section.

FIG. 11 shows a modified version 100 of the landscape edging form assembly 80. The generally L-shaped landscape edging form assembly 100 includes sidewalls 102 and 104, flexible connector strands 106, and joining extensions 108. The sidewall 104 has upper and lower sections 110 and 112. The lower portion of the lower section 112 of the sidewall 104 is connected to the lower portion of the sidewall 102 by a flexible sheet material 114 and the upper portion of the lower section 112 of the sidewall 104 is connected to the lower portion of the upper section 110 of the sidewall 104 by a flexible sheet material 116. The flexible sheet materials 114 and 116 perform the function of the lower rows of flexible connector strands 86 that connect the lower portion of the sidewall 82 with the lower section 94 of the sidewall 84 in the landscape edging form assembly 80. Other than the use of the flexible sheet materials 114 and 116 for the lower rows of flexible connector strands 86 in the landscape edging form assembly 80, the landscape edging form assemblies 80 and 100 are the same. The flexible sheet materials 114 and 116 may be made of various flexible sheet materials that preferably are sufficiently flexible to permit the form assembly 100 to be collapsed so that the sidewalls 102 and 104 are in contact with each other, such as but not limited to fiberglass mesh or scrim materials, woven or nonwoven polymeric fiber or fiber glass sheet materials, or polymeric or paper sheet materials. For some applications, the sheet materials may be made of a semi-rigid or bendable material such as a semi-rigid linerboard above a selected weight. The landscape edging form assemblies 80 and 100 may be disposable or reusable.

Just as angled and curved landscape edging form assemblies (the landscape edging form assemblies 40 and 60) having the same basic structure and cross sectional configuration as the landscape edging form assembly 20 can be fabricated as discussed above, in a similar manner angled and curved landscape edging form assemblies (not shown) having the same basic structure and cross sectional configuration as the landscape edging form assemblies 80 and 100 can also be fabricated.

Figure 12:
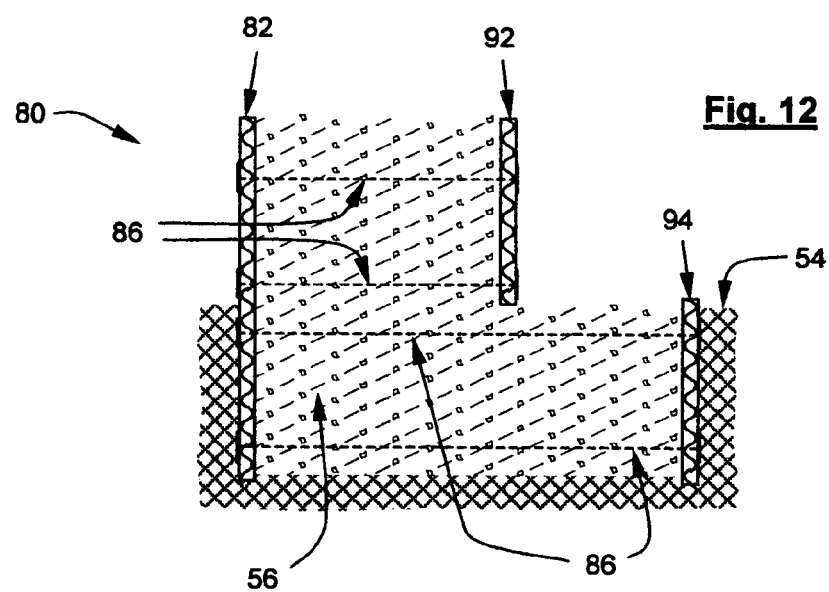
FIG. 12 is a transverse cross section through the landscape edging form assembly of FIG. 9, on a larger scale, showing the landscape edging form assembly erected and filled with concrete.

FIG. 12 is a schematic transverse cross section through the landscape edging form assembly 80 of FIG. 9. The form assembly 80 is erected, located with the base portion of the form assembly in the ground 54, and filled with concrete 56. The flexible connector strands 86, shown in phantom line, are taut and connect the sidewall 82 with the sections 92 and 94 of the sidewall 84. While the landscape edging form assembly 80 is shown with upper surface of the concrete in the base portion of the form assembly 80 at ground level so that the upper surface of the base portion of the concrete landscape edging formed with the form assembly 80 is located at ground level, the ground 54 may be prepared so that the upper surface of the concrete within the base portion of the landscape edging form assembly 80 is somewhat above or below ground level so that the upper surface of the base portion of the concrete landscape edging formed with the form assembly 80 is somewhat above or below ground level.

FIG. 13 is a schematic transverse cross section through a modification 180 of the landscape edging form assembly 80 of FIG. 9. With the exception of the sidewall contours, the landscape edging form assembly 180 is the same as the landscape edging form assembly 80. The upper edge portion of the sidewall 182 of the landscape edging form assembly 180 is inclined inwardly and the sections 192 and 194 of the sidewall 184 of the landscape edging form assembly 180 are curved. As shown, the form assembly 180 is erected, located with the base portion of the form assembly in the ground 54, and filled with concrete 56. The flexible connector strands 186, shown in phantom line, are taut and connect the sidewall 182 with the sections 192 and 194 of the sidewall 184. While the landscape edging form assembly 180 is shown with upper surface of the concrete in the base portion of the form assembly 180 at ground level so that the upper surface of the base portion of the concrete landscape edging formed with the form assembly 180 is located at ground level, the ground 54 may be prepared so that the upper surface of the concrete within the base portion of the landscape edging form assembly 180 is somewhat above or below ground level so that the upper surface of the base portion of the concrete landscape edging formed with the form assembly 180 is somewhat above or below ground level.

FIG. 14 is a schematic perspective view of a landscape edging form assembly 120 of the subject invention that includes sidewalls 122 and positioning brackets such as but not limited to positioning brackets 124 or 126. The landscape edging form assembly 120 also includes the use of spacers such as but not limited to spacers 26 or 30 and/or retaining stakes 128. Preferably, the sidewalls are provided with joining extensions 130 of the same type used with the landscape edging form assembly 20.

The landscape edging form assembly 120 is fabricated at the job site and may be fabricated into curved or sinuous configurations as shown in FIG. 14, straight and/or angled configurations, and arcuate, round, or oval configurations. Where the landscape edging form assembly 120 is fabricated to make a small diameter form, e.g. a form about two or three feet in diameter, the sidewalls 122 are typically each made from a single piece of sheet material. However, a series of the landscape edging form assemblies can be joined together, e.g. with the joining extensions 130 to fabricate landscape edging forms of any length, diameter, or dimensions. Thus, while the landscape edging form assembly 120 is typically fabricated to be about 2 to about 8 inches wide, by about 3 to about 8 inches high, by about 4 to about 10 feet in length, the width, height, and length of the landscape edging form assembly 120 can be selected to best fulfill the requirements of a particular application.

The sidewalls 122 of the landscape edging form assembly 120 may be made of various rigid materials (for straight form sections) and bendable or flexible sheet materials (for curved form sections) such as but not limited to faced corrugated paperboard, linerboard, polymer-based sheet materials, faced or unfaced corrugated board made of polymer-based materials, faced or unfaced polymer-based foams, various sheet metals including corrugated sheet metal and galvanized sheet metal, or composites of two or more such sheet materials. The sidewall sheet materials will be discussed in greater detail later in the specification. The spacing between the sidewalls is set by positioning brackets, such as but not limited to the positioning brackets 124 or 126 of FIGS. 15 and 16, which engage the outside surfaces of the sidewalls 122. The positioning brackets 124 and 126 are typically made of metallic or plastic rods. The positioning bracket 124 has two vertical rod members joined by a horizontal cross member with the length of the horizontal rod member setting the width of the landscape edging form assembly 120. When the positioning brackets are made of metal rods, the rods are joined together by welding or other common metal working techniques. When the positioning brackets are made of plastic, the positioning brackets can be molded. Preferably, the positioning brackets can be easily snapped off at ground level, located immediately above the cross member of the positioning bracket 124, for removal of the upper portions of the positioning brackets when removing the form assembly 120 after a concrete landscape edging has been formed with the form assembly 120. The sidewalls 122 are held against, preferably held firmly against, the positioning brackets by spacers such as but not limited to the spacers 30 which have a width substantially equal to but slightly less than the length of the cross member of the positioning bracket, or by retaining members such as the retaining member 128 of FIG. 17.

When fabricating the landscape edging form assembly 120 at the job site, the ground is prepared for the form assembly 120 or a series of the form assemblies 120. The positioning brackets, e.g. positioning brackets 124 or 126, are located and driven into the ground to locate the sidewalls 122 in the desired straight and/or curved configurations for the landscape edging form being fabricated from the assemblies. The spacings between successive positioning brackets are selected so that the positioning brackets cooperate with the sidewalls to keep the sidewalls from bowing outward between the positioning brackets.

Preferably, the positioning brackets are driven into the ground until the cross members of the positioning brackets are at ground level or somewhat recessed into the ground. This causes the lower longitudinal edges of the sidewalls 122 of the form assemblies 120 to rest or substantially rest on the ground so that little or no concrete passes out beneath the sidewalls 122 when the concrete is introduced into the form assemblies. This also assures that the positioning brackets are firmly anchored in the ground. Next the sidewalls 122 are placed within the positioning brackets with the lengths of sidewall sheet material following the configuration laid out by the positioning brackets. The sections of the sidewall sheet material forming the sidewalls 122 are joined together by the joining extensions or other joining means. Either spacers, such as the spacers 26 and 30 are inserted between inside surfaces of the sidewalls 122 to press the sidewalls 122 against the positioning brackets and/or retaining members such as the retaining members 128 are located and driven into the ground to contact the inside surfaces of the sidewalls 122 and press the sidewalls against the positioning brackets. Next concrete is introduced into the landscape edging form thus fabricated. Once sufficient concrete is introduced into the fabricated landscape edging form to hold the sidewalls 122 against the positioning brackets, the spacers 30 or retaining members may be removed so that they do not affect the appearance of the concrete landscape edging being formed. A spacer such as the spacer 26 is left in place until the concrete sets to form control joints in the concrete landscape edging. After the concrete has set, preferably, the upper portions of the positioning brackets are snapped off or otherwise removed and the sidewalls 122 are removed from the concrete landscape edging.

FIG. 18 is a schematic perspective view of an erected landscape edging form assembly 140 of the subject invention that can be configured at the job site. The landscape edging form assembly 140 includes sidewalls 142 and flexible connector strands 144, such as but not limited to flexible connector strands like the T-end flexible connector strands 48. The sidewalls 142 are each provided with a series of markings or slots 146 extending downward from the upper longitudinal edges and upward from the bottom longitudinal edges of the sidewalls. In one embodiment, the markings or slots 146 in each series of markings or slots are equidistant from each other. The flexible connector strands 144 are equal in length and are secured to the sidewalls at equal or different spacings between successive connector strands to configure the landscape edging form assembly. For example, to fabricate a landscape edging form assembly 140 that is straight or a portion of the landscape edging form assembly 140 that is straight, the spacings between the locations on the sidewalls where the successive flexible connector stands 144 are attached would be the same for both sidewalls and the flexible connector strands 144 would be attached to the two sidewalls with an equal number of marking or slots 146 between the attachment locations on each of the sidewalls. To fabricate a landscape edging form assembly 140 that is curved or a portion of the landscape edging form assembly that is curved, the spacings between the locations on the sidewalls where the successive flexible connector stands 144 are attached would be different for the two sidewalls and the flexible connector strands 144 would be attached to the two sidewalls with a different number of marking or slots 146 between the attachment locations on each of the sidewalls. Once the landscape edging form assembly 140 is fabricated, the landscape edging form assembly 140 could be erected and filled with concrete in the same manner as the landscape edging from assemblies 20, 40 and 60 to make a concrete landscape edging.

FIGS. 19 and 20 show end caps that may be used to close the otherwise open ends of landscape edging forms made with the landscape edging form assemblies of the subject invention. The end cap 150 shown in FIG. 19 may be used with the landscape edging form assemblies shown in FIGS. 1, 5, 6, 14 or 18. The end cap 160 shown in FIG. 20 may be used with the landscape edging form assemblies shown in FIGS. 9 and 11. The end caps 150 and 160 are preferably made of the same sheet materials used for the sidewalls of the landscape edging form assemblies of the subject invention and are sufficiently rigid that the end caps 150 and 160 do not bow outward when an edging form to which they are applied is filled with concrete. The end walls 152 and 162 of the end caps 150 and 160 have the same size and shape as the transverse cross section of the form assemblies these end caps are used to close. The end cap 150 has joining extensions 154 with inside surfaces of a pressure sensitive adhesive 156 overlaid by release liners 158. The end cap 160 has joining extensions 164 with inside surfaces of a pressure sensitive adhesive 166 overlaid by release liners 168. The end caps 150 and 160 can be applied to the ends of landscape edging forms made with the landscape edging release assemblies of the subject invention by merely removing the release liners and pressing the joining extensions against the outside surfaces of the sidewalls of the form assemblies.

Preferably, the sheet materials used for the sidewalls of all of the landscaped edging form assemblies of the subject invention are inexpensive, lightweight, and sufficiently stiff to withstand the outward pressure exerted on the sidewalls by the concrete introduced into the landscape edging form assemblies to form concrete landscape edgings without bowing outward. In addition, it is preferable that the sheet materials of the sidewalls cut easily e.g. cut easily with scissors or shears, so that the sidewalls of the landscaped edging form assemblies can be shortened or otherwise modified for certain applications. As discussed above, the sidewalls and the spacers 26 and 88 may be made of various rigid, bendable, or flexible sheet materials, such as but not limited to, faced or unfaced corrugated paperboard, linerboard, polymer-based sheet materials, faced or unfaced corrugated board made of polymer-based materials, faced or unfaced polymer-based foams, various sheet metals including corrugated sheet metal and galvanized sheet metal, or a composite of two or more such materials. The polymer-based foam materials may be closed cell or open cell foam materials made of various conventional polymer-based foams, such as but not limited to polyisocyanurate foams, and may be unfaced or faced with various facing materials such as paper, foil, scrims, etc. Where a smooth surface on the concrete landscape edging is desired, it is preferred to face the inside surfaces of the sidewalls made with the open cell foam materials. While for most applications it is preferred to use the relatively inexpensive, lightweight, easy to handle and modify sheet materials discussed above, it is also contemplated that for certain applications, metal strip materials heavier than normal sheet metals and wooden strip materials heavier than linerboard or corrugated board could be used for the sidewalls. A preferred sheet material for the sidewalls and the spacers 26 and 88 of the landscape edging form assemblies of the subject invention is a faced corrugated paperboard that has a water resistant inside surface and upper edge (e.g. a faced corrugated paperboard that has been treated with a water resistant coating or overlaid with a water resistant tape and has a top longitudinal edge treated with a water resistant coating or wrapped with a water resistant pressure sensitive adhesive tape) to prevent moisture from entering the sidewall through the inside surface of the sidewall or the top edge of the sidewall, e.g. when the concrete is introduced into the form assembly. In one embodiment of the sheet material for the sidewalls of the landscape edging form assemblies of the subject invention, a tape overlays the inside surface of the faced corrugated paperboard of the sheet material and overlaps both the upper and lower longitudinal edges of the sidewall. A corrugated paperboard with a C flute corrugation manufactured by Deline Box Company has been used as the sheet material for the sidewalls of a landscape edging form assembly of the subject invention. A water resistant coating marketed by Michelman Incorporated under the trade designation "Michelman X300" water resistant coating has been used to coat the sidewalls of a landscape edging form assembly of the subject invention and a water resistant tape marketed by 3M Corporation under the trade designation Scotch®brand packaging tape has been used to tape the top longitudinal edge of corrugated paperboard used for the sidewalls of a landscape edging form assembly of the subject invention. While for the landscape edging form assemblies of the subject invention that have a straight configuration the sidewalls may be rigid, bendable, or flexible, for curved landscaped edging form assemblies of the subject invention the sidewalls should be flexible or at least easily bendable.

The inside surfaces of one or both of the sidewalls of the landscape edging form assemblies of the subject invention may be embossed or debossed to form aesthetic designs, effects or patterns on the concrete landscape edging formed with the form assemblies. In addition, the inside surfaces of the one or both of the sidewalls of the landscape edging form assemblies of the subject invention may have a colorant thereon that transfers to the surface(s) of the concrete landscape edging formed by the form assemblies.

As discussed above, the flexible connectors used in the landscape edging form assemblies of the subject invention to interconnect the sidewalls of the form assemblies may be flexible connectors such as but not limited to strands, wires, straps, strings, cords, threads, and/or twines, that are made from organic and/or inorganic filament(s) and/or fiber(s). Preferably, the flexible connectors go limp or slack when the connectors are not under tension and are sufficiently flexible to enable the landscape edging form assemblies of the subject invention to be easily collapsed so that one of the sidewalls of any one of the landscape edging form assemblies can overlay and be in contact with the other sidewall of the landscape edging form assembly for packaging, storage, shipping, and handling of the landscape edging form assembly prior to its erection at the job site. A preferred flexible connector strand utilized in the landscape edging form assemblies of the subject invention is a connector with T-ends or paddle ends marketed under the trade designation Swiftachment® Fastening System by Avery Dennison.

As discussed above, the locations where the flexible connectors are anchored to the sidewalls of the various landscape edging form assemblies of the subject invention, including, the spacing or spacings between the individual flexible connectors, should be set to assure that the flexible connectors in combination with the sidewalls can withstand the outward pressure to be exerted on the sidewalls of the landscape edging form assemblies by concrete introduced into the form assemblies without having the ends of the flexible connectors separate from the sidewalls or the sidewalls bow outwardly. However, in the preferred embodiments of the invention, the flexible connectors interconnecting the sidewalls of the landscape edging form assemblies can be easily separated from the sidewalls by simply gripping and stripping the sidewalls from the concrete landscape edging formed with the form assemblies. The ability to separate the flexible connectors from the sidewalls by stripping the sidewalls from the concrete landscape edging formed with the form assemblies together with the use of release coatings on the inside surfaces of the sidewalls make the removal of the form assemblies from a concrete landscape edging both quick and easy. Once the sidewalls of the landscape edging form assemblies are removed from the concrete landscape edging, the free ends of the flexible connectors can be easily cut off at the surface of the concrete landscape edging.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A landscape edging form assembly for forming a concrete edging in place, wherein:
the landscape edging form assembly has a length, a non-erected width and an erected width greater than the non-erected width, and a height;
the landscape edging form assembly has first and second sidewalls; and each of the sidewalls has a height of about eight inches or less, a length, a top longitudinally extending edge and a bottom longitudinally extending edge; the first and second sidewalls of the landscape edging form assembly are bendable whereby a landscape edging form made of a series of the landscape edging form assemblies can have a straight, angled, curved, circular, oval or sinuous configuration;
the landscape edging form assembly includes a first joining extension means with a pressure sensitive adhesive for overlapping and being bonded to an end portion of the first sidewall of the landscape edging form assembly and an end portion of a first sidewall of an adjacent landscape edging form assembly to join and close a joint between the first sidewalls and a second joining extension means with a pressure sensitive adhesive for overlapping and being bonded to an end portion of the second sidewall of the landscape edging form assembly and an end portion of a second sidewall of an adjacent landscape edging form assembly to join and close a joint between the second sidewalls when the landscape edging form assembly is erected and combined with the adjacent landscape edging form assembly in the erection of a landscape edging form made up of a series of the landscape edging form assemblies;
the landscape edging form assembly has a series of flexible connectors extending between and interconnecting the first and second sidewalls; the flexible connectors are selected from the group consisting of wire, straps, cords, twines, strings, and strands; the flexible connectors are spaced apart from each other in the direction of the length of the landscape edging form assembly and enable the landscape edging form assembly to be extended from the non-erected width where the flexible connectors are in a slack condition to the erected width where the flexible connectors are in a taut condition; and
the first and second sidewalls and the series of flexible connectors are a prefabricated component of the landscape edging form assembly; and the landscape edging form assembly can be in a collapsed non-erected state with one of the first and second sidewalls lying on the other of the first and second sidewalls and the flexible connectors of the landscape edging form assembly in the slack condition for packaging, shipment, storage, and handling prior to erection of the landscape edging form assembly.

2. The landscape edging form assembly for forming a concrete edging in place according to claim 1, wherein:
the first and second sidewalls are easily cut with scissors or shears and are selected from the group consisting of a linerboard material, a faced or unfaced corrugated paper or polymer-based board material, a polymer-based sheet material, a faced or unfaced polymer-based foam sheet material, a sheet metal, and a composite including one or more of the linerboard material, the faced or unfaced corrugated paper or polymer-based board material, the polymer-based sheet material, the faced or unfaced polymer-based foam sheet material and the sheet metal.

3. The landscape edging form assembly for forming a concrete edging in place according to claim 1, wherein:
the landscape edging form assembly includes generally inverted U-shaped spacer means for insertion between the first and second sidewalls of the landscape edging form assembly when the landscape edging form assembly is erected to hold the first and second sidewalls of the landscape edging form assembly apart with the flexible connectors in the taut condition and the landscape edging form assembly in the erected position.

4. The landscape edging form assembly for forming a concrete edging in place according to claim 3, wherein:
the spacer means of the landscape edging form assembly is also for forming a control joint in a concrete edging fabricated with the use of the landscape edging form assembly.

5. The landscape edging form assembly for forming a concrete edging in place according to claim 1, wherein:
inside surfaces of the first and second sidewalls of the landscape edging form assembly are treated with a release agent so that the first and second sidewalls can be easily separated from a concrete edging fabricated with the use of the landscape edging form assembly.

6. The landscape edging form assembly for forming a concrete edging in place according to claim 1, wherein:
an inside surface of at least one of the first and second sidewalls of the landscape edging form assembly is embossed or debossed with an aesthetic design, effect, or pattern to impart the design, effect, or pattern to a landscape edging fabricated with the use of the landscape edging form assembly.

7. The landscape edging form assembly for forming a concrete edging in place according to claim 1, wherein:
an inside surface of at least one of the first and second sidewalls of the landscape edging form assembly is coated with a colorant for transfer to a surface of a landscape edging fabricated with the use of the landscape edging form assembly.

8. The landscape edging form assembly for forming a concrete edging in place according to claim 1, wherein:
the first sidewall of the landscape edging form assembly is greater in length than the second sidewall of the landscape edging form assembly; and the flexible connectors extend between the first and second sidewalls to cause the landscape edging form assembly to assume a curved configuration when the flexible connectors are in the taut condition.

9. The landscape edging form assembly for forming a concrete edging in place according to claim 1, wherein:
the second sidewall of the landscape edging form assembly includes an upper section and a lower section; the series of flexible connectors extending between and interconnecting the first and second sidewalls includes an upper series of the flexible connectors that are spaced apart from each other in the direction of the length of the landscape edging form assembly and a lower series of the flexible connectors that are spaced apart from each other in the direction of the length of the landscape edging form assembly; the flexible connectors of the upper series of the flexible connectors extend between and interconnect the first sidewall with the upper section of the second sidewall and the flexible connectors of the lower series of the flexible connectors extend between and interconnect the first sidewall with the lower section of the second sidewall; and the flexible connectors of the lower series of the flexible connectors are longer than the flexible connectors of the upper series of the flexible connectors whereby, when the landscape edging form assembly is erected, the upper section of the second sidewall is located closer to the first sidewall than the lower section of the second sidewall to create a form that has a stepped sidewall.

10. The landscape edging form assembly for forming a concrete edging in place according to claim 9, wherein:

the first and second sidewalls are selected from the group consisting of a linerboard material, a faced or unfaced corrugated paper or polymer-based board material, a polymer-based sheet material, a faced or unfaced polymer-based foam sheet material, a sheet metal or a composite including one or more of the linerboard material, the faced or unfaced corrugated paper or polymer-based board material, the polymer-based sheet material, the faced or unfaced polymer-based foam sheet material and the sheet metal; and the flexible connectors are selected from the group consisting of wire, straps, cords, twines, strings, and strands.

11. The landscape edging form assembly for forming a concrete edging in place according to claim 9, wherein:

the landscape edging form assembly includes spacer means for insertion between the first and second sidewalls of the landscape edging form assembly when the landscape edging form assembly is erected to hold the first and second sidewalls of the landscape edging form assembly apart with the flexible connectors in the taut condition and the landscape edging form assembly in the erected position.

12. The landscape edging form assembly for forming a concrete edging in place according to claim 11, wherein:

the spacer means of the landscape edging form assembly is also for forming a control joint in a concrete edging fabricated with the use of the landscape edging form assembly.

13. The landscape edging form assembly for forming a concrete edging in place according to claim 9, wherein:

inside surfaces of the first and second sidewalls of the landscape edging form assembly are treated with a release agent so that the first and second sidewalls can be easily separated from a concrete edging fabricated with the use of the landscape edging form assembly.

14. The landscape edging form assembly for forming a concrete edging in place according to claim 9, wherein:

an inside surface of at least one of the first and second sidewalls of the landscape edging form assembly is embossed or debossed with an aesthetic design, effect, or pattern to impart the design, effect, or pattern to a landscape edging fabricated with the use of the landscape edging form assembly.

15. The landscape edging form assembly for forming a concrete edging in place according to claim 9, wherein:

an inside surface of at least one of the first and second sidewalls of the landscape edging form assembly is coated with a colorant for transfer to a surface of a landscape edging fabricated with the use of the landscape edging form assembly.

16. The landscape edging form assembly for forming a concrete edging in place according to claim 9, wherein:

the first sidewall of the landscape edging form assembly is greater in length than the second sidewall of the landscape edging form assembly; and the flexible connectors extend between the first and second sidewalls to cause the landscape edging form assembly to assume a curved configuration when the flexible connectors are in the taut condition.

\* \* \* \* \*